US012718725B2

(12) United States Patent
Tsuchi

(10) Patent No.: US 12,718,725 B2
(45) Date of Patent: Aug. 25, 2026

(54) LEVEL VOLTAGE GENERATION CIRCUIT, DISPLAY DRIVER, AND DISPLAY DEVICE

(71) Applicant: ROHM Co., Ltd., Kyoto (JP)

(72) Inventor: Hiroshi Tsuchi, Kyoto (JP)

(73) Assignee: ROHM Co., Ltd., Kyoto (JP)

( * ) Notice: Subject to any disclaimer, the term of this patent is extended or adjusted under 35 U.S.C. 154(b) by 0 days.

(21) Appl. No.: 19/087,577

(22) Filed: Mar. 23, 2025

(65) Prior Publication Data

US 2025/0308425 A1 Oct. 2, 2025

(30) Foreign Application Priority Data

Mar. 29, 2024 (JP) ................................ 2024-055516

(51) Int. Cl.
*G09G 3/20* (2006.01)

(52) U.S. Cl.
CPC ....... *G09G 3/20* (2013.01); *G09G 2320/0233* (2013.01); *G09G 2320/0673* (2013.01)

(58) Field of Classification Search
CPC ............ G09G 3/20; G09G 2320/0233; G09G 2320/0673
See application file for complete search history.

(56) References Cited

U.S. PATENT DOCUMENTS

2005/0128113 A1* 6/2005 Kyung-Myun ...... G09G 3/3688 341/138
2006/0214900 A1* 9/2006 Tsuchi ................. H03M 1/661 345/98
2008/0100380 A1* 5/2008 Nishimura ............ H03F 3/4521 330/252
2008/0143665 A1* 6/2008 Nishimura ........... G09G 3/3677 345/204

(Continued)

FOREIGN PATENT DOCUMENTS

JP 2009008958 1/2009
JP 2009008958 A * 1/2009

*Primary Examiner* — Ke Xiao
*Assistant Examiner* — Jennifer L Zubajlo
(74) *Attorney, Agent, or Firm* — JCIPRNET

(57) ABSTRACT

The level voltage generation circuit includes: a resistor string that outputs multiple level voltages having different voltage levels respectively from multiple taps; a reference voltage generation part that generates m reference voltages having different voltage values respectively according to a desired gamma characteristic; and first to $m^{th}$ gamma buffers that operate by receiving supply of power supply voltages to individually amplify the m reference voltages, and generate and output m gamma voltages to m taps. At least one gamma buffer includes: an offset cancellation amplifier including an offset cancellation circuit that removes an offset occurring in the gamma voltage output by the gamma buffer itself in response to a binary control signal; and a control signal output circuit that generates the control signal with two voltages as the binary, and outputs the control signal to the offset cancellation circuit. The two voltages are selected from the m gamma voltages and the power supply voltages, and have a voltage difference lower than the power supply voltages.

12 Claims, 19 Drawing Sheets

(56) References Cited

U.S. PATENT DOCUMENTS

| | | | | |
|---|---|---|---|---|
| 2008/0180427 | A1* | 7/2008 | Nishimura | G09G 3/3688<br>345/209 |
| 2009/0179890 | A1* | 7/2009 | Nishimura | G09G 3/3688<br>330/253 |
| 2010/0265274 | A1* | 10/2010 | Han | G09G 3/3688<br>345/89 |
| 2013/0148407 | A1* | 6/2013 | Tsuji | G11C 13/004<br>365/148 |
| 2013/0194284 | A1* | 8/2013 | Bi | H03M 1/682<br>345/522 |
| 2015/0222252 | A1* | 8/2015 | Kim | H03F 3/45771<br>327/307 |
| 2024/0135859 | A1* | 4/2024 | Chang | G09G 3/2096 |

* cited by examiner

[First process]

LEVEL VOLTAGE GENERATION CIRCUIT, DISPLAY DRIVER, AND DISPLAY DEVICE

CROSS-REFERENCE TO RELATED APPLICATION

This application claims the priority benefits of Japanese application no. 2024-055516, filed on Mar. 29, 2024. The entirety of the above-mentioned patent application is hereby incorporated by reference herein and made a part of this specification.

TECHNICAL FIELD

The disclosure relates to a voltage generation circuit that generates multiple voltages with different voltage levels, a display driver, and a display device.

RELATED ART

A liquid crystal type or organic EL type display device includes a display panel in which multiple gate lines extending in the horizontal direction of a two-dimensional screen and multiple source lines extending in the vertical direction of the two-dimensional screen are arranged, a gate driver which drives the gate lines, and a source driver which drives the source lines.

The source driver includes a decoder that receives pixel data fragments representing the brightness level of each pixel based on a video signal, and converts each of the pixel data fragments into a gradation voltage having a voltage value corresponding to the brightness level indicated by the pixel data fragment. The decoder selects one from multiple gradation voltages generated by a gradation voltage generation part that corresponds to the brightness level indicated by the pixel data fragment, and supplies this selected gradation voltage to the source line of the display panel.

As the above-mentioned gradation voltage generation part, it has been proposed to use a gradation voltage generation part that includes first and second ladder resistors in which multiple resistors are directly connected, a selector, and a gamma amplifier group (see, for example, FIG. 3 of Patent Literature 1 (Japanese Patent Application Laid-Open No. 2009-8958)). The selector described in FIG. 3 of Patent Literature 1 selects six voltages (V2 to V7) having voltage values according to the desired gamma characteristic from multiple voltages generated by the first ladder resistor 107, and individually supplies each of the voltages to each of the gamma amplifiers (A1 to A6). Here, the voltage group amplified by each gamma amplifier is applied to each of the desired taps in the second ladder resistor 153, and in this case, the voltage generated at each tap of the second ladder resistor is output as the multiple gradation voltages mentioned above.

However, with the recent trend toward display panels with larger screens and higher resolutions, source drivers are constructed by division into multiple IC chips, each of which is installed in parallel along the horizontal direction of the two-dimensional screen of the display panel.

Here, the error amount of each gradation voltage generated within each IC chip with respect to the desired voltage value may differ for each IC chip due to manufacturing variations and other factors. Therefore, if the difference in error amount is large, there is a risk that unevenness in the displayed image may be visually perceived.

Thus, in the gradation voltage generation part, it is desired to generate highly accurate gradation voltages with small error amounts with respect to the desired voltage values.

In order to achieve higher accuracy of gradation voltages, it is conceivable to increase the size of the transistors that constitute the above-mentioned gamma amplifiers, but this leads to the problem of increased circuit area required to construct multiple gamma amplifiers.

Therefore, the disclosure provides a level voltage generation circuit, a display driver, and a display device capable of generating multiple desired highly accurate level voltages while suppressing circuit area.

SUMMARY

A level voltage generation circuit according to an embodiment of the disclosure includes: a resistor string including a plurality of resistors connected in series to each other respectively via each of a plurality of taps, and outputting a plurality of level voltages having different voltage levels respectively from the taps; a reference voltage generation part generating m (m is an integer of 2 or more) reference voltages having different voltage values respectively according to a desired gamma characteristic; and first to $m^{th}$ gamma buffers operating by individually receiving the m reference voltages respectively, and receiving supply of two power supply voltages to generate, as m gamma voltages, m voltages obtained by individually amplifying the m reference voltages, and output the m gamma voltages to m taps among the plurality of taps. At least one gamma buffer among the first to $m^{th}$ gamma buffers includes: an offset cancellation amplifier including an offset cancellation circuit that removes an offset voltage occurring in the gamma voltage output by the at least one gamma buffer in response to a control signal of a binary; and a control signal output circuit receiving two voltages which are selected from the m gamma voltages output by the first to $m^{th}$ gamma buffers including the at least one gamma buffer and the two power supply voltages and in which a voltage difference therebetween is lower than a difference between the two power supply voltages, generating the control signal with the two voltages as the binary, and outputting the control signal to the offset cancellation circuit.

A display driver according to an embodiment of the disclosure includes the above-mentioned level voltage generation circuit as a gradation voltage generation circuit. The offset cancellation circuit includes a first capacitive element, and the offset cancellation amplifier executes sequentially: a first process of accumulating the offset voltage or the gamma voltage causing the offset voltage in the first capacitive element based on the control signal; and a second process of holding the voltage accumulated in the first capacitive element, and supplying a gamma voltage with the offset voltage removed from the gamma voltage output by the one gamma buffer to the tap of the resistor string. The control signal output circuit generates the control signal having one of the two voltages in the first process; and generates the control signal having the other one of the two voltages in the second process, and the first process is performed within a vertical blanking period of a frame period in a video signal.

A display device according to an embodiment of the disclosure includes: a display panel including a plurality of data lines on which a plurality of display cells are disposed; and a display driver including the above-mentioned level voltage generation circuit as a gradation voltage generation circuit, using the plurality of level voltages output from the level voltage generation circuit as a plurality of gradation voltages, selecting for each pixel based on a video signal the gradation voltage corresponding to a brightness level indicated by the pixel from among the plurality of gradation voltages, and outputting a drive signal having the selected gradation voltage to the data line.

DESCRIPTION OF EMBODIMENTS

In the disclosure, a gamma buffer including an offset cancellation circuit is adopted as the above-mentioned gamma buffer used in the level voltage generation circuit that generates multiple level voltages by applying multiple gamma voltages output from multiple gamma buffers to a resistor string.

Furthermore, in the disclosure, as a binary control signal for controlling the operation of such an offset cancellation circuit, a low-amplitude control signal is generated using two voltages as the binary. The two voltages are selected from multiple gamma voltages output by multiple gamma buffers including the gamma buffer itself and two power supply voltages, and have a voltage difference lower than the difference between the two power supply voltages. By performing on-off control of the transistor responsible for controlling the offset cancellation circuit with such a low-amplitude control signal, the amount of feedthrough due to coupling of the parasitic capacitance of this transistor is suppressed, making it possible to reduce the offset voltage accompanying this feedthrough. Thus, it is possible to generate multiple highly accurate level voltages according to the desired gamma characteristic without increasing the capacitance values of the capacitive elements constituting the offset cancellation circuit in order to achieve high accuracy.

Therefore, according to the disclosure, it is possible to output multiple desired voltage levels with high accuracy while suppressing an increase in circuit scale.

The following describes the disclosure in detail with reference to the drawings.

Example 1

Figure 1:
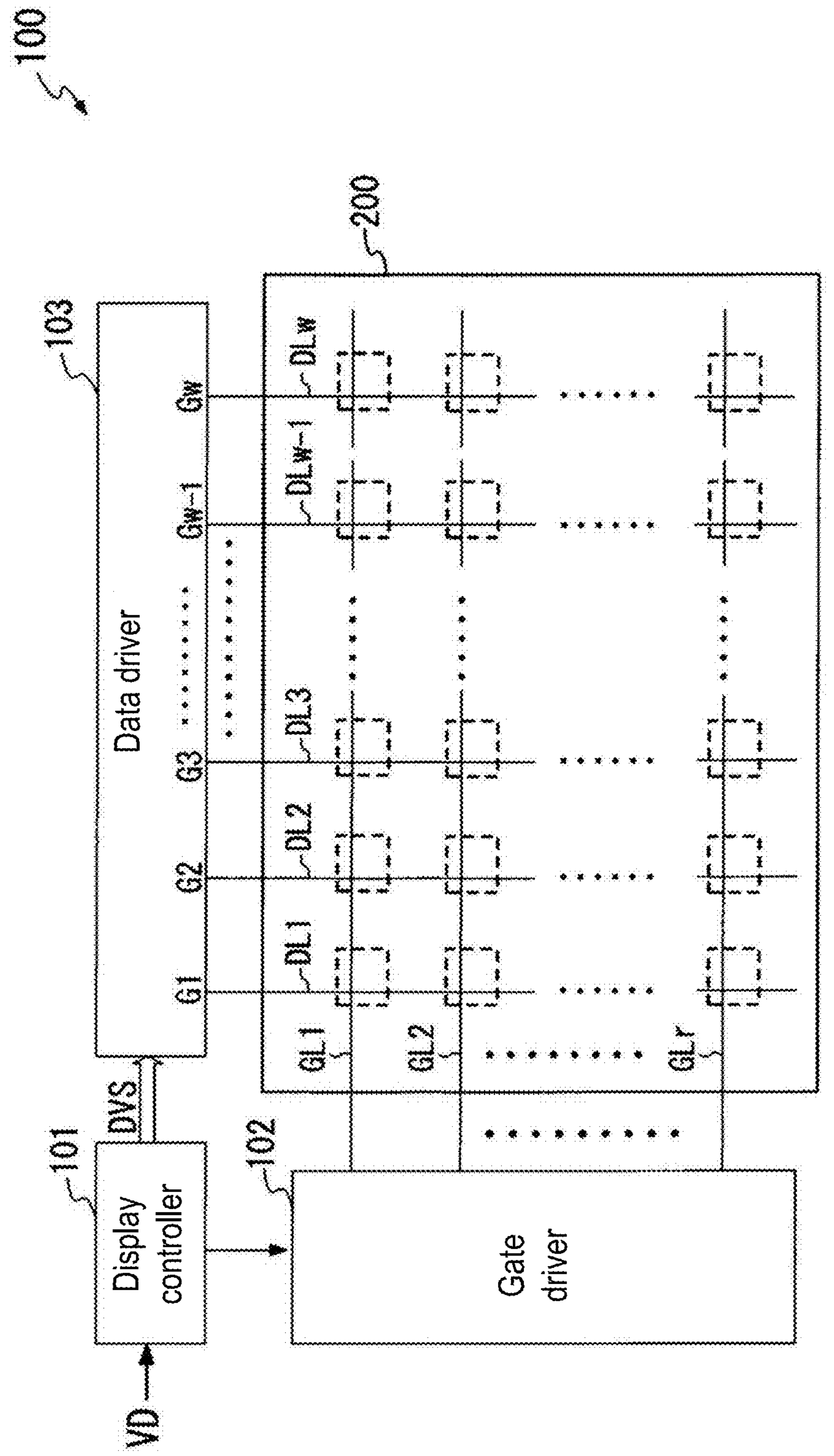
FIG. 1 is a block diagram showing the schematic configuration of the display device 100 equipped with the display driver including the level voltage generation circuit according to the disclosure.

FIG. 1 is a block diagram showing the schematic configuration of a display device 100 equipped with a display driver including the level voltage generation circuit according to the disclosure.

The display device 100 includes a display controller 101, a gate driver 102, a data driver 103, and a display panel 200.

The display panel 200 is composed of, for example, a liquid crystal or organic EL type display panel, and includes gate lines GL1 to GLr (r is an integer of 2 or more) extending in the horizontal direction of a two-dimensional screen, and data lines DL1 to DLw (w is an integer of 2 or more) extending in the vertical direction of the two-dimensional screen. At each intersection of the gate lines GL1 to GLr and the data lines DL1 to DLw, a display cell (areas enclosed by dotted lines) that performs red, green, or blue display is formed.

The display controller 101 receives a video signal VD, and based on this video signal VD, supplies a gate timing signal to the gate driver 102, indicating the timing for applying a gate selection signal to each of the gate lines GL1 to GLr.

Additionally, the display controller 101, based on the video signal VD, generates various control signals including a clock signal and a load signal, and a video data signal DVS including a series of pixel data fragments representing the brightness level of each pixel in digital values, and supplies these to the data driver 103.

In response to the gate timing signal supplied from the display controller 101, the gate driver 102 sequentially generates gate selection signals including at least one pulse for selecting a gate line, and supplies the same to each of the gate lines GL1 to GLr of the display panel 200.

The data driver 103 captures each of the pixel data fragments included in the video data signal DVS in units of w/S lines (divided by the number of data drivers (S) that drive one horizontal scan line (w lines)), and converts each pixel data fragment into a drive signal having a voltage value corresponding to the brightness level represented by each fragment. Then, the data driver 103 supplies the generated (w/S) drive signals as drive signals G1 to Gw respectively to the data lines DL1 to DLw of the display panel 200. It should be noted that FIG. 1 shows a configuration example of the display device 100 including one data driver (S=1).

Figure 2:
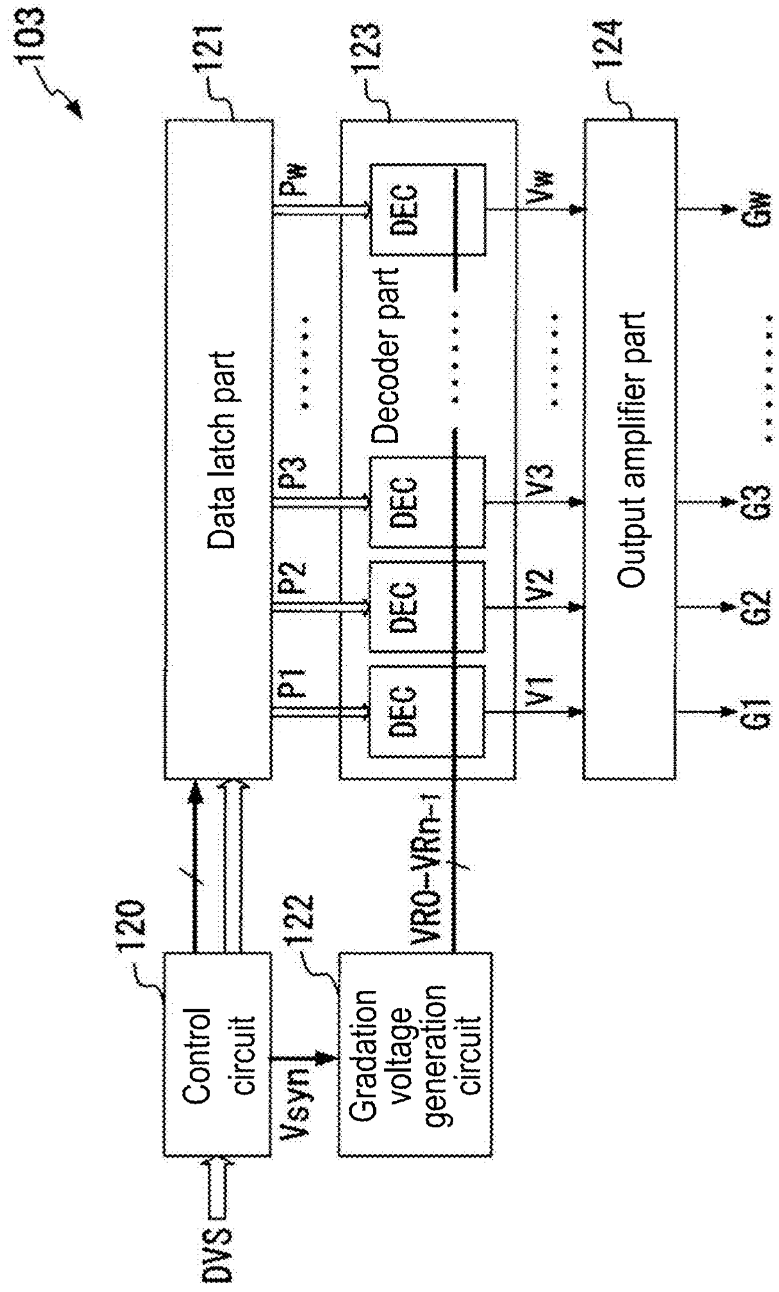
FIG. 2 is a block diagram schematically showing the internal configuration of the data driver 103.

FIG. 2 is a block diagram schematically showing the internal configuration of the data driver 103. The following also describes an example with one data driver (S=1).

As shown in FIG. 2, the data driver 103 includes a control circuit 120, a data latch part 121, a gradation voltage generation circuit 122 as the level voltage generation circuit according to the disclosure, a decoder part 123, and an amplifier part 124.

The control circuit 120 receives the video data signal DVS, and extracts from this video data signal DVS various control signals including a horizontal synchronization signal, a vertical synchronization signal, a clock signal, and a load signal, as well as the series of pixel data fragments. The control circuit 120 supplies the extracted clock signal, load signal, and series of pixel data fragments to the data latch part 121, and supplies the extracted vertical synchronization signal as a vertical synchronization signal Vsyn to the gradation voltage generation circuit 122.

The data latch part 121, in response to the load signal, sequentially captures each pixel data fragment in the series of pixel data fragments at the timing of the clock signal. Every time the data latch part 121 captures w pixel data fragments, these w pixel data fragments are output as pixel data P1 to Pw to the decoder part 123.

The gradation voltage generation circuit 122 generates gradation voltages VR0 to VR(n−1) (n is an integer of 2 or more) each having a voltage value according to a specified gamma characteristic, and supplies the generated gradation voltages VR0 to VR(n−1) to the decoder part 123. It should be noted that in generating the gradation voltages VR0 to VR(n−1), the gradation voltage generation circuit 122 performs offset cancellation of an operational amplifier (to be described later) included within the gradation voltage generation circuit 122 for each frame period in response to the vertical synchronization signal Vsyn.

The decoder part 123 includes w decoders DEC, each individually receiving the pixel data P1 to Pw output from the data latch part 121. Each of the decoders DEC receives the above-mentioned gradation voltages VR0 to VR(n−1), and selects from these gradation voltages VR0 to VR(n−1) a gradation voltage having a voltage value corresponding to the brightness level indicated by the pixel data fragment received. The decoder part 123 receives w gradation voltages selected by each decoder DEC, and supplies gradation signals V1 to Vw having the respective voltage values to the amplifier part 124.

The amplifier part 124 individually amplifies the gradation signals V1 to Vw, and outputs the same as the above-mentioned drive signals G1 to Gw to the data lines DL1 to DLw of the display panel 200.

The following describes the gradation voltage generation circuit 122 in detail.

Figure 3:
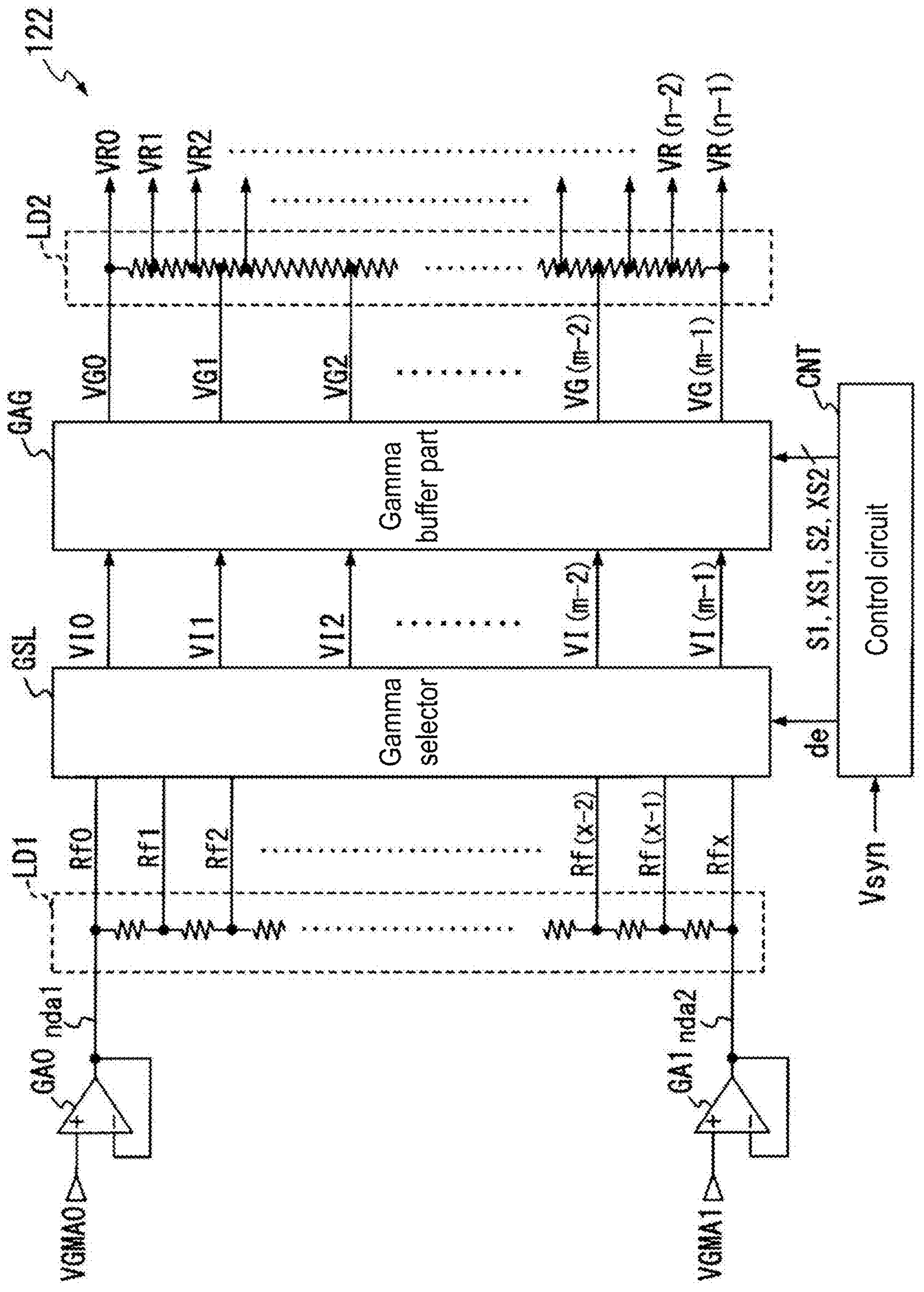
FIG. 3 is a circuit diagram showing an example of the internal configuration of the gradation voltage generation circuit 122.

FIG. 3 is a circuit diagram showing an example of the internal configuration of the gradation voltage generation circuit 122.

As shown in FIG. 3, the gradation voltage generation circuit 122 includes amplifiers GA0 and GA1, a first resistor string LD1 and a second resistor string LD2, a gamma selector GSL, a gamma buffer part GAG, and a control circuit CNT.

The amplifiers GA0 and GA1 are gamma amplifiers for input, each including, for example, an operational amplifier of voltage follower with the inverting input terminal connected to the output terminal. The amplifier GA0 receives a DC first voltage VGMA0 at the non-inverting input terminal, and applies a voltage having the same voltage value as the voltage VGMA0 to a node nda0. The amplifier GA1 receives a DC second voltage VGMA1, which has a lower voltage value than the voltage VGMA0, at the non-inverting input terminal, and applies a voltage having the same voltage value as this voltage VGMA1 to a node nda1.

The resistor string LD1 includes first to $x^{th}$ (x is an integer of 2 or more) resistors connected in series between the node nda0 and the node nda1, and supplies the voltage at each of the (x+1) connection points (referred to as taps) of the first to $x^{th}$ resistors as reference voltages Rf0 to Rfx to the gamma selector GSL.

The control circuit CNT supplies a gamma characteristic specification signal de specifying the desired gamma characteristic to the gamma selector GSL. Furthermore, the control circuit CNT generates, in response to the vertical synchronization signal Vsyn, binary (logic level 0 or 1) switch signals S1, XS1, S2, and XS2 that control the offset cancellation operation, and supplies each to the gamma buffer part GAG. It should be noted that the switch signal XS1 is a logical inversion signal of S1, and XS2 is a logical inversion signal of S2.

The gamma selector GSL receives the reference voltages Rf0 to Rfx, and selects m (m is an integer of 2 or more) reference voltages having voltage values according to the gamma characteristic specified by the gamma characteristic specification signal de from among these reference voltages Rf0 to Rfx. Then, the gamma selector GSL outputs the selected m reference voltages as reference voltages VI0 to VI(m−1), respectively. It should be noted that the reference voltages VI0 to VI(m−1) have the following relationship.

$$VI0>VI1>VI2> \ldots >VI(m-2)>VI(m-1)$$

The gamma buffer part GAG receives the reference voltages VI0 to VI(m−1), individually amplifies each of the reference voltages VI0 to VI(m−1), and generates the obtained voltage group as gamma voltages VG0 to VG(m−1). It should be noted that the gamma voltages VG0 to VG(m−1) have the following relationship.

$$VG0>VG1>VG2> \ldots >VG(m-2)>VG(m-1)$$

The gamma buffer part GAG applies the gamma voltages VG0 to VG(m−1) to each tap including one terminal and the other terminal of the resistor string LD2, as shown in FIG. 3.

The second resistor string LD2 includes a series resistor group in which multiple resistors are connected in series. The resistor string LD2 outputs n voltages generated at each of the n taps as the above-mentioned gradation voltages VR0 to VR(n−1), based on the gamma voltages VG0 and VG(m−

1) respectively applied to one terminal and the other terminal of the series resistor group, and the gamma voltages VG1 to VG(m−2) applied to the connection points (referred to as taps) of each resistor.

Figure 4A:
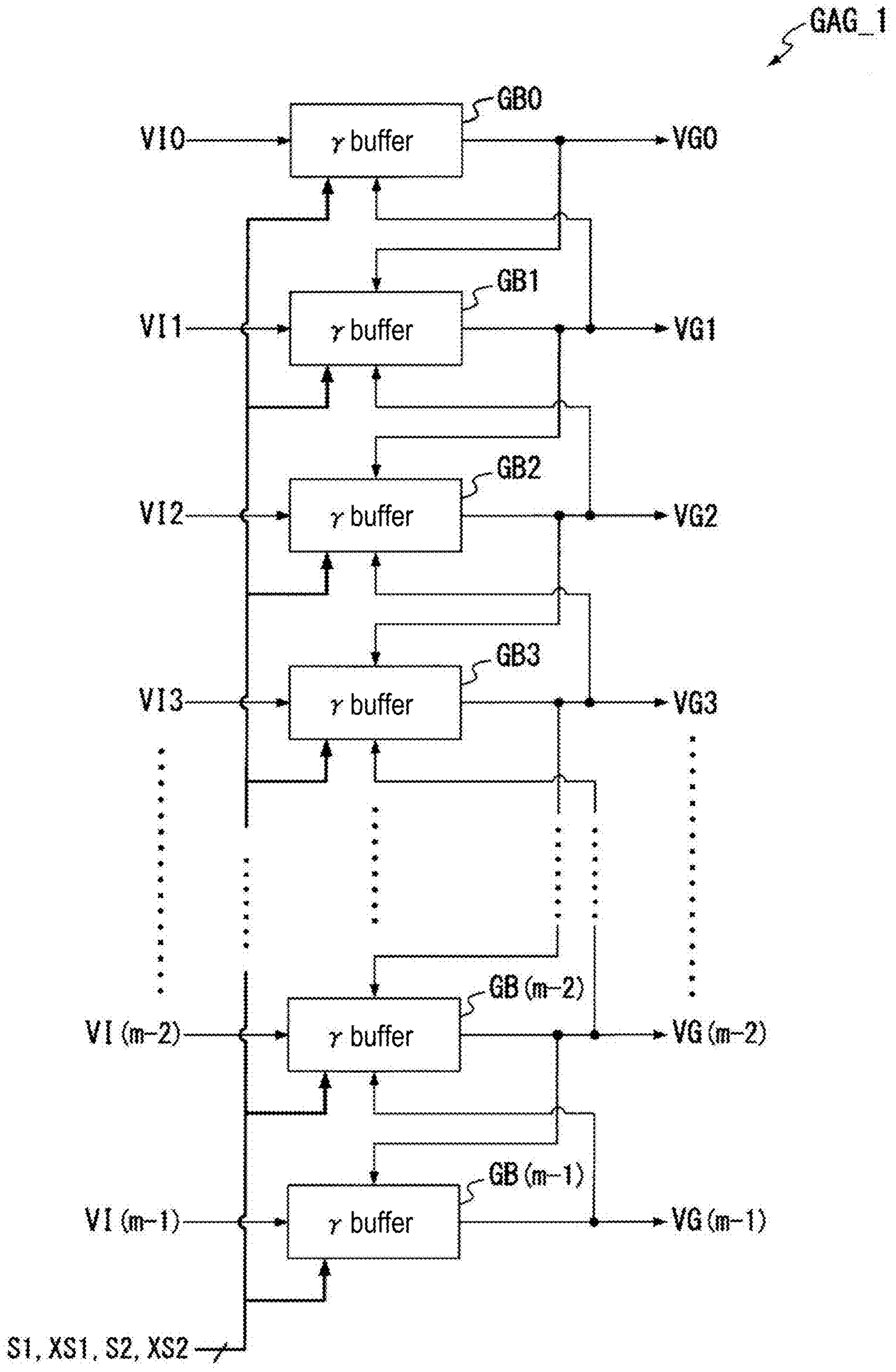
FIG. 4A is a block diagram showing the gamma buffer part GAG_1 as an example of the internal configuration of the gamma buffer part GAG.
Figure 4B:
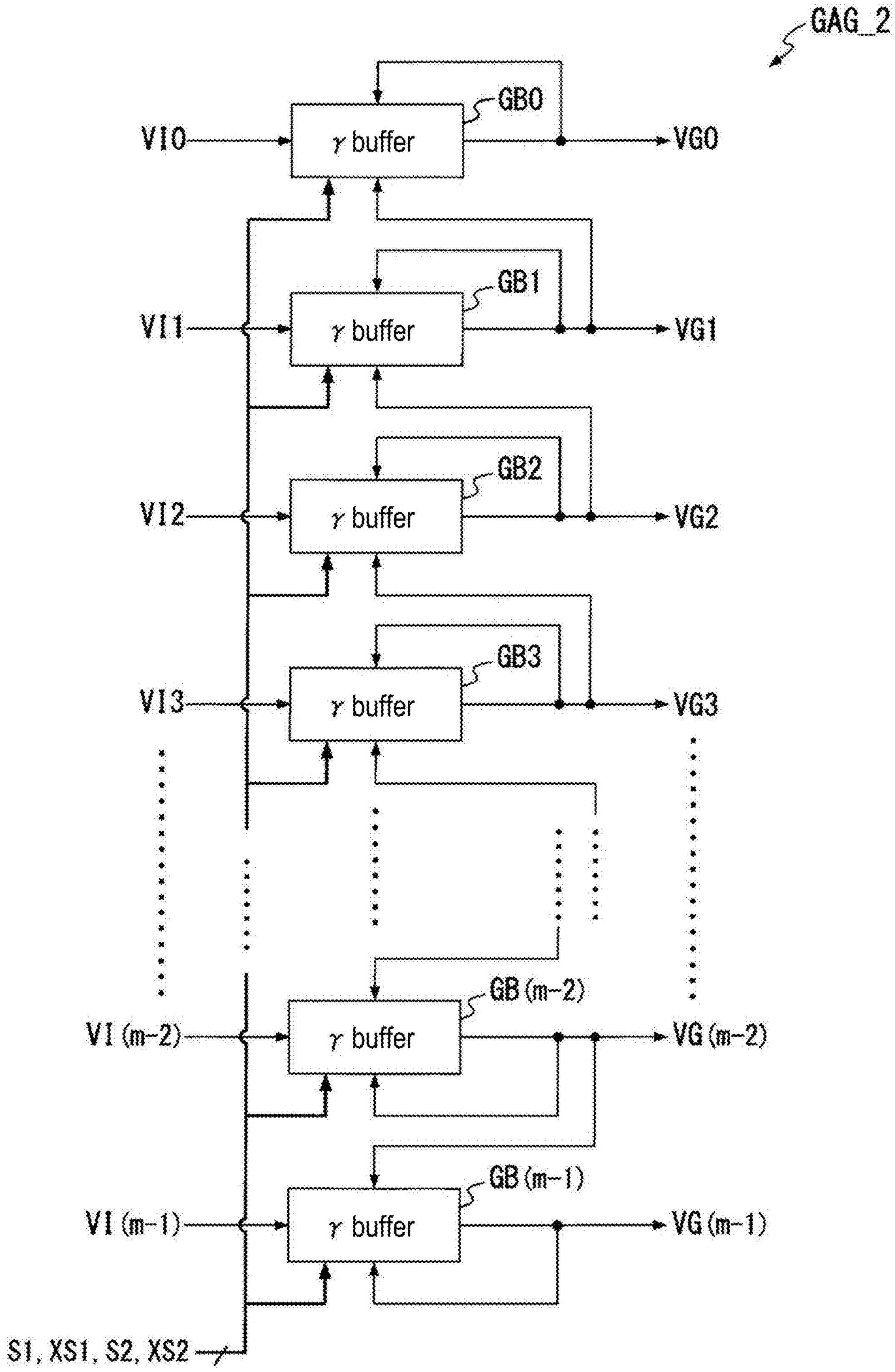
FIG. 4B is a block diagram showing the gamma buffer part GAG_2 as another internal configuration of the gamma buffer part GAG.

FIG. 4A and FIG. 4B are block diagrams showing GAG_1 and GAG_2 as examples of the internal configuration of the gamma buffer part GAG.

As shown in FIG. 4A and FIG. 4B, the gamma buffer parts GAG_1 and GAG_2 include gamma buffers GB0 to GB(m−1) that individually receive the reference voltages VI0 to VI(m−1), respectively. Each of the gamma buffers GB0 to GB(m−1) is a voltage follower including an operational amplifier with an offset cancellation circuit controlled by the above-mentioned switch signals S1, XS1, S2, and XS2, and operates with the supply of a first power supply voltage VDD and a second power supply voltage VSS. It should be noted that the first power supply voltage VDD is higher than the gamma voltage VG0, and the second power supply voltage VSS is lower than the gamma voltage VG(m−1). In FIG. 4A and FIG. 4B, the first power supply voltage VDD and the second power supply voltage VSS supplied to each of the gamma buffers GB0 to GB(m−1) are omitted to avoid complicating the drawings.

The gamma buffers GB0 to GB(m−1) individually amplify the reference voltages VI0 to VI(m−1), respectively, and apply the obtained voltage group as the gamma voltages VG0 to VG(m−1) to each tap of the resistor string LD2.

It should be noted that each of the gamma buffers GB0 to GB(m−1) receives two gamma voltages from the group of gamma voltages output from the gamma buffers including the gamma voltage output by itself, in order to generate a binary control signal used for controlling the offset cancellation circuit by the above-mentioned switch signals S1 and XS1.

For example, in FIG. 4A, each of the gamma buffers GB1 to GB(m−2), excluding the gamma buffers at both ends among GB0 to GB(m−1), receives a gamma voltage higher than the gamma voltage it outputs and a gamma voltage lower than the gamma voltage it outputs, and generates a binary control signal based on the two gamma voltages it receives within itself. Among the gamma buffers GB0 to GB(m−1), the gamma buffer outputting the gamma voltage on the higher voltage side close to the first power supply voltage VDD includes at least a P-channel type transistor as a switching element involved in the offset cancellation operation, while the gamma buffer outputting the gamma voltage on the lower voltage side close to the second power supply voltage VSS includes at least an N-channel type transistor as a switching element involved in the offset cancellation operation. In addition, the gamma buffer outputting the gamma voltage that is an intermediate voltage that is a predetermined voltage difference or more away from the first power supply voltage VDD and the second power supply voltage VSS can use either P-channel type or N-channel type transistors as switch elements related to the offset cancellation operation. In the example shown in FIG. 4A, the gamma buffer GB1 receives the gamma voltage VG0, which is one level higher than the gamma voltage VG1 it outputs, and the gamma voltage VG2, which is one level lower than the gamma voltage VG1, and generates a binary control signal based on the gamma voltages VG0 and VG2 within itself. Also, the gamma buffer GB2 receives the gamma voltage VG1, which is one level higher than the gamma voltage VG2 it outputs, and the gamma voltage VG3, which is one level lower than the gamma voltage VG2, and generates a binary control signal based on the gamma voltages VG1 and VG3 within itself. Furthermore, the gamma buffer GB(m−2) receives the gamma voltage VG(m−3), which is one level higher than the gamma voltage VG(m−2) it outputs, and the gamma voltage VG(m−1), which is one level lower than the gamma voltage VG(m−2), and generates a binary control signal based on the gamma voltages VG(m−3) and VG(m−1) within itself. It should be noted that in a case where the voltage difference in one level between gamma voltages is small, the gamma buffer may be configured to receive gamma voltages that are two levels apart from the gamma voltage it outputs. In the following example, for convenience, the configuration example shown receives gamma voltages one level apart.

By the way, the gamma buffer GB0 receives the gamma voltage VG1, which is one level lower than the gamma voltage VG0 it outputs. On the other hand, since there is no gamma voltage higher than this gamma voltage VG0, the gamma buffer GB0 uses the first power supply voltage VDD as a voltage one level higher than the gamma voltage VG0, and generates a binary control signal based on the gamma voltages VG1 and the first power supply voltage VDD within itself.

In addition, the gamma buffer GB(m−1) receives the gamma voltage VG(m−2), which is higher than the gamma voltage VG(m−1) it outputs. On the other hand, since there is no gamma voltage lower than this gamma voltage VG(m−1), the gamma buffer GB(m−1) uses the second power supply voltage VSS as a voltage lower than the gamma voltage VG(m−1), and generates a binary control signal based on the gamma voltages VG(m−2) and the second power supply voltage VSS within itself.

On the other hand, FIG. 4B shows a configuration example of another gamma buffer part GAG_2 different from FIG. 4A. In FIG. 4B, each of the gamma buffers GB0 to GBj (j is an integer from 0 to m−2) on the higher voltage side among the gamma buffers GB0 to GB(m−1) receives the gamma voltage it outputs and a gamma voltage lower than the gamma voltage it outputs, and generates a binary control signal based on the two gamma voltages it receives within itself. In this case, each of the gamma buffers GB0 to GBj includes a P-channel type transistor as a switching element involved in the offset cancellation operation. In an example shown in FIG. 4B, the gamma buffer GB0 receives the gamma voltage VG0 it outputs and the gamma voltage VG1 which is one level lower than the gamma voltage VG0, and generates a binary control signal based on the gamma voltages VG0 and VG1 within itself. Also, the gamma buffer GB1 receives the gamma voltage VG1 it outputs and the gamma voltage VG2 which is one level lower than the gamma voltage VG1, and generates a binary control signal based on the gamma voltages VG1 and VG2 within itself.

Furthermore, each of the gamma buffers GB(j+1) to GB(m−1) on the lower voltage side among the gamma buffers GB0 to GB(m−1) receives the gamma voltage it outputs and a gamma voltage higher than the gamma voltage it outputs, and generates a binary control signal based on the two gamma voltages it receives within itself. In this case, each of the gamma buffers GB(j+1) to GB(m−1) includes an N-channel type transistor as a switching element involved in the offset cancellation operation. In an example shown in FIG. 4B, the gamma buffer GB(m−1) receives the gamma voltage VG(m−1) it outputs and the gamma voltage VG(m−2) which is one level higher than the gamma voltage VG(m−1), and generates a binary control signal based on the gamma voltages VG(m−1) and VG(m−2) within itself.

Figure 5:
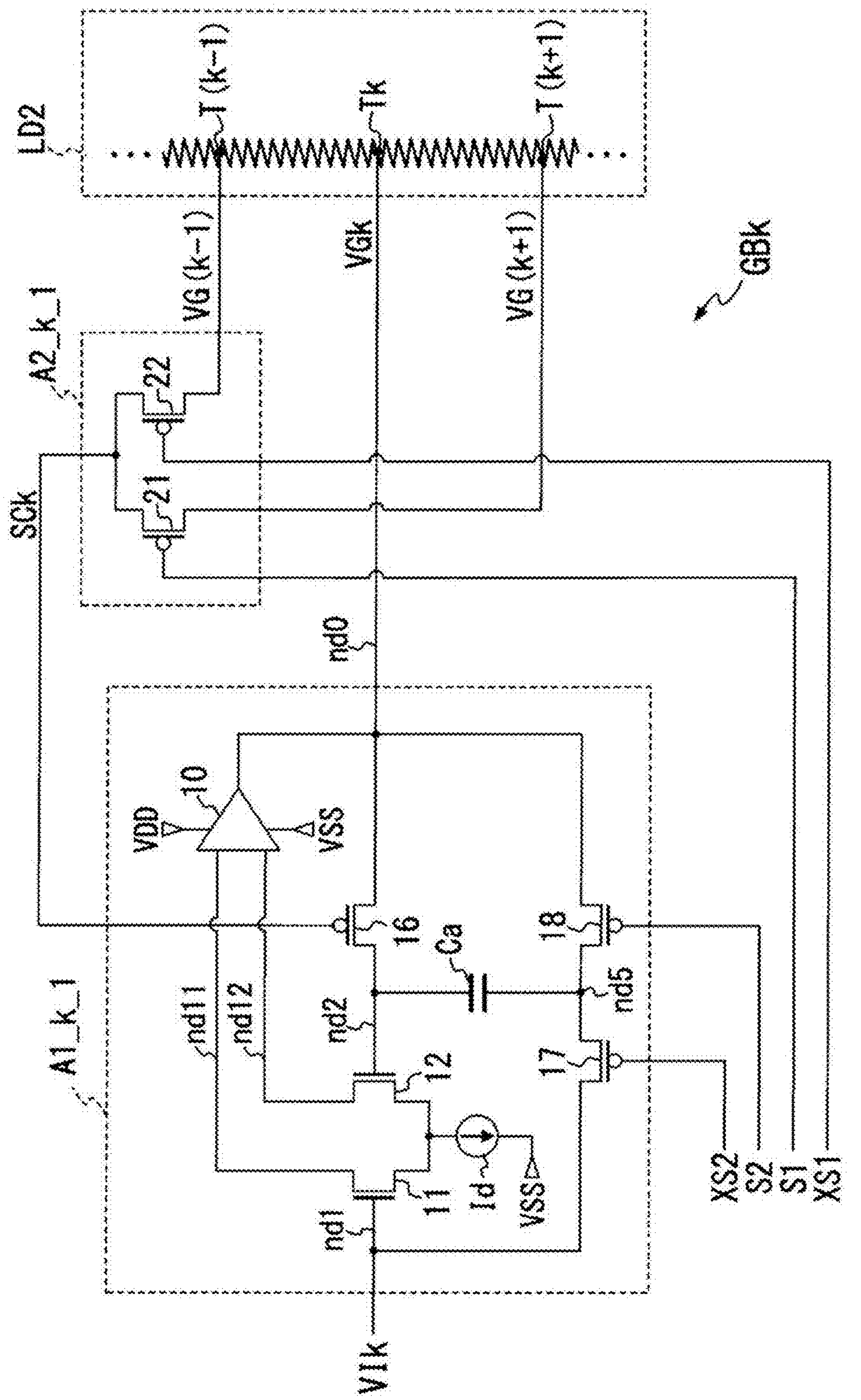
FIG. 5 is a circuit diagram showing the internal configuration of the gamma buffer GBk.

FIG. 5 is a circuit diagram showing an example of the internal configuration of the kl (k is an integer from 1 to m−2) gamma buffer GBk extracted from the gamma buffers GB0 to GB(m−1) in FIG. 4A.

As shown in FIG. 5, the gamma buffer GBk includes an offset cancellation amplifier A1_*k*_1 including the offset cancellation circuit, and a control signal output circuit A2_*k*_1.

The offset cancellation amplifier A1_*k*_1 includes an amplification stage 10, N-channel type transistors 11 and 12, P-channel type transistors 16 to 18 which are of reverse conductive type to these transistors 11 and 12, a capacitor Ca as a capacitive element, and a current source Id.

The transistor 11 receives a reference voltage VIk (k is an integer from 1 to m−2) supplied from the gamma selector GSL at the gate via a node nd1. The source of the transistor 11 is connected to the current source Id, and the drain is connected to the amplification stage 10 via a node nd11.

The transistor 12 receives a gamma voltage VGk (k is an integer from 1 to m−2) output from the gamma buffer GBk at the gate via the transistor 16 and a node nd2. The source of the transistor 12 is connected to the current source Id, and the drain is connected to the amplification stage 10 via a node nd12. The current source Id receives the power supply voltage VSS, and draws a predetermined constant current (tail current) from the sources of the transistors 11 and 12.

With this configuration, the differential pair (11, 12) including the transistors 11 and 12 flows a current pair corresponding to the difference between the reference voltage VIk, which is the voltage at the node nd1, and the voltage at the node nd2 to the nodes nd11 and nd12.

The amplification stage 10 operates by receiving the power supply voltage VDD and the power supply voltage VSS, and outputs a current corresponding to the difference between the currents flowing through the nodes nd11 and nd12 to an output node nd0 so as to make the voltage at the output node nd0 match the reference voltage VIk. In this case, the output node nd0 is connected to the tap Tk of resistor string LD2, and the voltage at this output node nd0 is applied to the tap Tk of the resistor string LD2 as the gamma voltage VGk.

The transistor 16 has one terminal of the source and drain connected to the output node nd0, and the other terminal of the source and drain connected to the node nd2. Additionally, the transistor 16 receives a low-amplitude control signal SCk supplied from the control signal output circuit A2_*k*_1 at the gate, and enters the off state in a case where this low-amplitude control signal SCk has a high voltage corresponding to logic level 1. On the other hand, in a case where the low-amplitude control signal SCk has a low voltage corresponding to logic level 0, the transistor 16 enters the on state, and supplies the voltage at the output node nd0 to the gate of the transistor 12 via the node nd2.

The transistor 17 has one terminal of the source and drain connected to the gate of the transistor 11 via the node nd1, and the other terminal of the source and drain connected to the node nd5. Additionally, the transistor 17 receives the switch signal XS2 supplied from the control circuit CNT at the gate, and enters the off state in a case where this switch signal XS2 has a high voltage corresponding to logic level 1. On the other hand, in a case where the switch signal XS2 has a low voltage corresponding to logic level 0, the transistor 17 enters the on state, and connects the node nd1 to the node nd5.

The transistor 18 has one terminal of the source and drain connected to the output node nd0, and the other terminal of the source and drain connected to the node nd5. Additionally, the transistor 18 receives the switch signal S2 supplied from the control circuit CNT at the gate, and enters the off state in a case where this switch signal S2 has a high voltage corresponding to logic level 1. On the other hand, in a case where the switch signal S2 has a low voltage corresponding to logic level 0, the transistor 18 enters the on state, and connects the output node nd0 to the node nd5.

The capacitor Ca has one terminal connected to the above-mentioned node nd2, and the other terminal connected to the node nd5.

It should be noted that the above-mentioned differential pair (11, 12) and the amplification stage 10 constitute the core operational amplifier of the gamma buffer GBk, while the capacitor Ca and the transistors 16 to 18, each serving as a switching element, form the offset cancellation circuit that removes the offset of this operational amplifier.

The control signal output circuit A2_*k*_1 includes P-channel type transistors 21 and 22.

The transistor 21 receives the gamma voltage VG(k+1) output to the tap T(k+1) of the resistor string LD2 by the gamma buffer GB(k+1) at one terminal of the source and drain, and receives the switch signal S1 supplied from the control circuit CNT at the gate.

The transistor 22 receives the gamma voltage VG(k−1) output to the tap T(k−1) of the resistor string LD2 by the gamma buffer GB(k−1) at one terminal of the source and drain, and receives the switch signal XS1 supplied from the control circuit CNT at the gate. However, the transistor 22 of the gamma buffer GB0 receives the power supply voltage VDD at one terminal of the source and drain.

Furthermore, the other terminal of the source and drain of each of the transistors 21 and 22 is commonly connected to the gate of the transistor 16. That is, the control signal output circuit A2_*k*_1 generates the low-amplitude control signal SCk having the gamma voltages VG(k+1) and VG(k−1) as binary signals by controlling the on or off state of the transistors 21 and 22 based on the switch signals S1 and XS1, and controls the on or off of the transistor 16 based on the low-amplitude control signal SCk.

It should be noted that the gamma voltages VG(k−1), VGk, and VG(k+1), as well as the power supply voltages VDD and VSS, have the following relationship.

$$VDD>VG(k-1)>VGk>VG(k+1)>VSS$$

Moreover, the voltage difference between the gamma voltage VGk and the gamma voltage VG(k+1) is assumed to be higher than the threshold voltage of the transistor 16.

Here, the transistor 21 enters the off state in a case where the switch signal S1 received at the gate has the power supply voltage VDD corresponding to logic level 1. On the other hand, in a case where the switch signal S1 has the power supply voltage VSS corresponding to logic level 0, the transistor 21 enters the on state, and supplies a signal having the above-mentioned gamma voltage VG(k+1) as the low-amplitude control signal SCk to the gate of the transistor 16. As a result, the transistor 16 is controlled to be in the on state.

On the other hand, the transistor 22 enters the off state in a case where the switch signal XS1 received at the gate has the power supply voltage VDD corresponding to logic level 1. On the other hand, in a case where the switch signal XS1 has the power supply voltage VSS corresponding to logic level 0, the transistor 22 enters the on state, and supplies a signal having the above-mentioned gamma voltage VG(k−1) as the low-amplitude control signal SCk to the gate of the transistor 16. As a result, the transistor 16 is controlled to be in the off state.

The following describes the operation of the $k^{th}$ (k is an integer from 1 to m−2) gamma buffer GBk, shown in FIG. 5, extracted from the gamma buffers GB0 to GB(m−1).

First, in response to the vertical synchronization signal (Vsyn) included in the video data signal DVS, the control circuit CNT generates the switch signals S1, XS1, S2, and XS2 for controlling the operation of the offset cancellation circuit (16 to 18, Ca), and supplies the same to the gamma buffer GBk.

Figure 6:
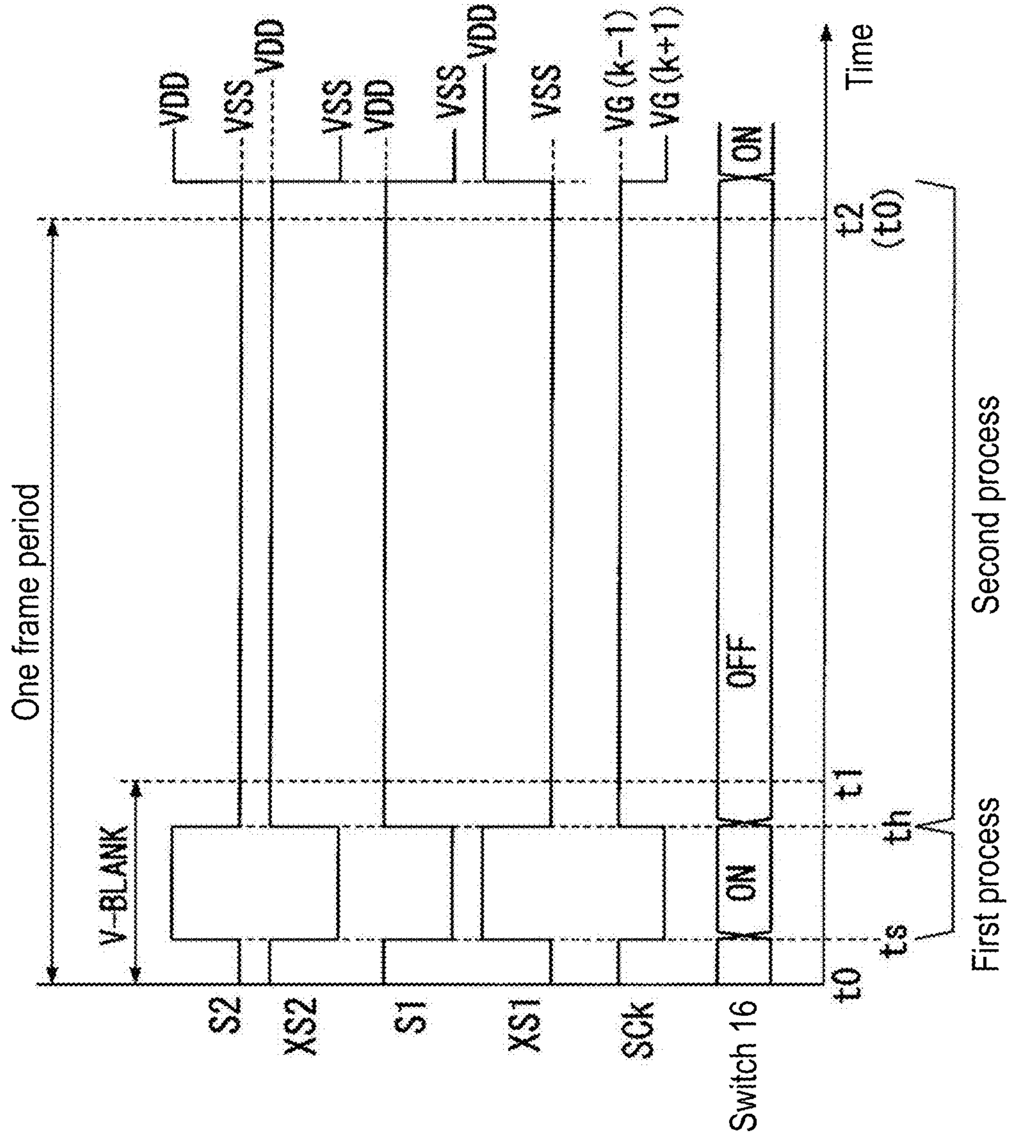
FIG. 6 is a time chart showing waveforms of the switch signals S1, XS1, S2, and XS2, and the low-amplitude control signal SCk, and transition of the state of the transistor 16.

FIG. 6 is a time chart showing waveforms of the switch signals S1, XS1, S2, and XS2, and the low-amplitude control signal SCk in FIG. 5, as well as transition of the state of the transistor 16.

The switch signals S1 and XS1 transition from logic level 1 (VDD) and logic level 0 (VSS), which respectively control transistor 21 to an off state and transistor 22 to an on state, to logic level 0 (VSS) and logic level 1 (VDD), which respectively control transistor 21 to an on state and transistor 22 to an off state, at time point ts within the vertical blanking period (from time point t0 to time point t1) in one frame for each frame period. As a result, the low-amplitude control signal SCk transitions from logic level 1 (VG(k−1)) that controls the transistor 16 to an off state to logic level 0 (VG(k−1)) that controls the transistor 16 to an on state. Then, the switch signals S1 and XS1 maintain this state until time point th within the vertical blanking period (first process). Furthermore, the switch signals S1 and XS1 again transition to logic level 1 (VDD) and logic level 0 (VSS) which respectively control the transistor 21 to the off state and the transistor 22 to the on state. As a result, the low-amplitude control signal SCk again transitions to logic level 1 (VG(k−1)) which controls the transistor 16 to the off state. The switch signals S1 and XS1 then maintain this state until time point ts within the next vertical blanking period (second process).

On the other hand, the switch signals XS2 and S2 transition from logic level 1 (VDD) and logic level 0 (VSS) which respectively control the transistor 17 to the off state and the transistor 18 to the on state at time point ts within the vertical blanking period in one frame for each frame period to logic level 0 (VSS) and logic level 1 (VDD) which respectively control the transistor 17 to the on state and the transistor 18 to the off state, and maintain this state until time point th within the vertical blanking period (first process). Then, the switch signals XS2 and S2 transition again to logic level 1 (VDD) and logic level 0 (VSS) which respectively control the transistor 17 to the off state and the transistor 18 to the on state at this time point th, and maintain this state until time point ts within the next vertical blanking period (second process).

In this manner, each of the switch signals S1, XS1, S2, and XS2 is a binary signal with a relatively large amplitude that varies in signal level between the power supply voltage VDD and the power supply voltage VSS.

It should be noted that the switch signals XS1 and S2 are almost synchronized signals as shown in FIG. 6, but strictly speaking, it is preferable to control so that at time point th, the change in the low-amplitude control signal SCk that changes the transistor 16 to the off state occurs slightly before or simultaneously with the change in the switch signal S2 that changes the transistor 18 to the on state. In other words, since it is the switch signal XS1 that changes the low-amplitude control signal SCk at time point th, the timing of the change in the switch signal XS1 in the vicinity of time point th is set to be slightly ahead of the change timing of the switch signal S2.

Next, the offset cancellation operation performed within each of the gamma buffers GB1 to GBm in response to such switch signals S1 (XS2) and S2 (XS1) will be described.

[First Process]

Figure 7A:
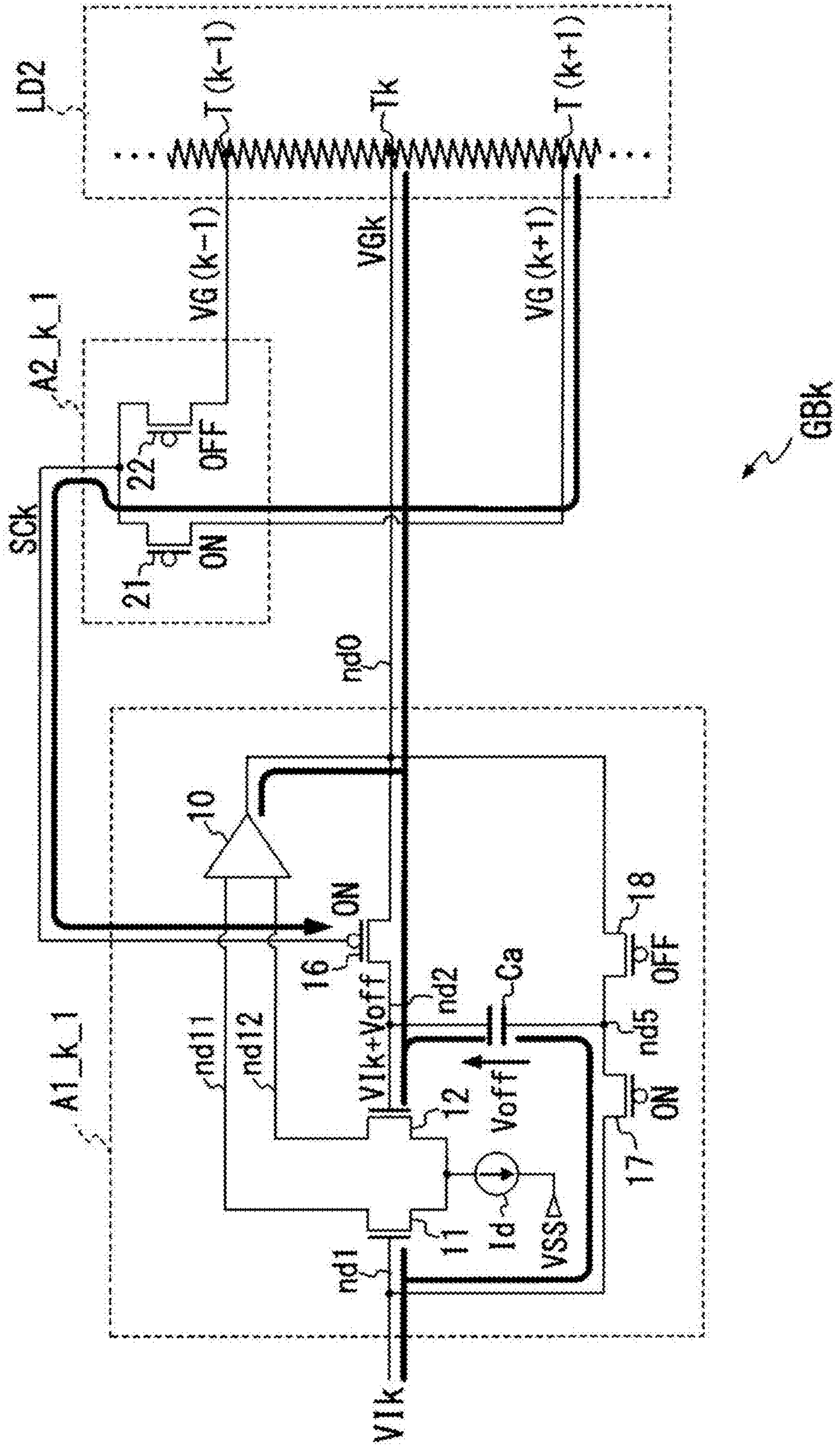
FIG. 7A is a schematic circuit diagram showing on-off states of the transistors 16 to 18, 21, and 22 of the gamma buffer GBk in the first process, and the current path indicated by a thick solid line.

FIG. 7A is a schematic circuit diagram showing the on-off states of the transistors 16 to 18, 21, and 22 of the gamma buffer GBk in the first process shown in FIG. 6, and the current path indicated by a thick solid line.

As shown in FIG. 7A, in the first process, the transistors 17 and 21 are in the on state, while the transistors 18 and 22 are in the off state.

As the transistor 21 enters the on state, the low-amplitude control signal SCk having the gamma voltage VG(k+1) is supplied to the gate of the transistor 16. In this case, since the gamma voltage VG(k+1) is lower than the gamma voltage Vk and the voltage difference therebetween is higher than the threshold voltage of the transistor 16, the transistor 16 enters the on state.

Therefore, as the transistor 16 enters the on state, as shown by the thick solid line in FIG. 7A, the voltage of the output node nd0 is applied as a feedback voltage to one terminal of the capacitor Ca together with the gate of the transistor 12 via the transistor 16. Furthermore, in the first process, as described above, the transistor 17 is in the on state and the transistor 18 is in the off state, resulting in the gates of the transistors 11 and 12 of the differential pair being connected via the capacitor Ca, as shown by the thick solid line in FIG. 7A.

In this case, if the offset voltage of the offset cancellation amplifier A1_*k*_1 occurs in the voltage of the output node nd0, the voltage on the node nd2 becomes a voltage (VIk+Voff) that the offset voltage Voff, which is the offset portion, is added to the reference voltage VIk that should originally be the voltage of the output node nd0. As a result, the voltage (VIk+Voff) is applied to one terminal of the capacitor Ca, and the reference voltage VIk is applied to the other terminal, causing the offset voltage Voff to be accumulated in the capacitor Ca.

In other words, the first process enables detection of the offset voltage portion occurring in the voltage of the output node nd0.

[Second Process]

Figure 7B:
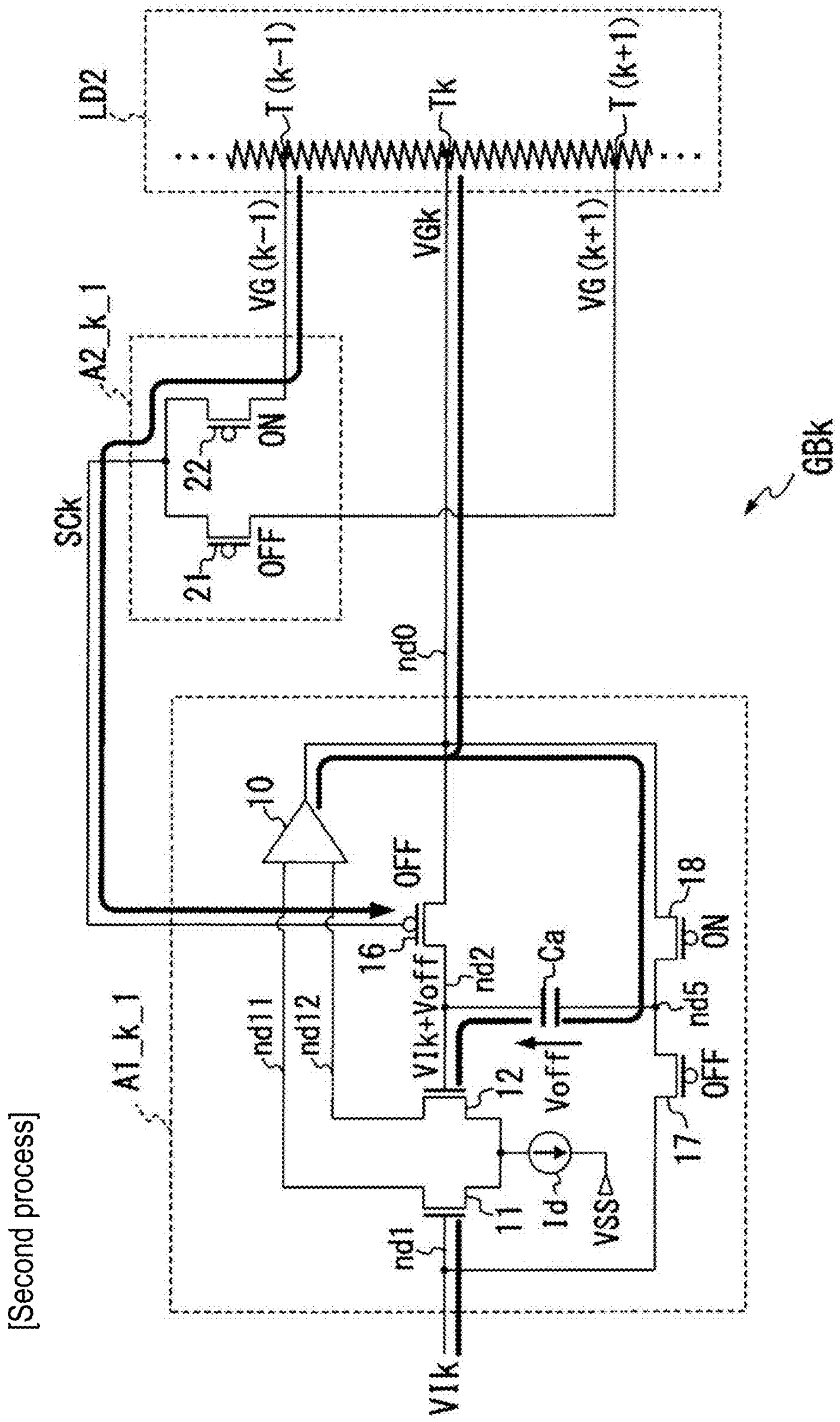
FIG. 7B is a schematic circuit diagram showing on-off states of the transistors 16 to 18, 21, and 22 of the gamma buffer GBk in the second process, and the current path indicated by a thick solid line.

FIG. 7B is a schematic circuit diagram showing the on-off states of the transistors 16 to 18, 21, and 22 of the gamma buffer GBk in the second process, that is, during a normal operation, shown in FIG. 6, and the current path indicated by a thick solid line.

As shown in FIG. 7B, in the second process, the transistors 18 and 22 are in the on state, while the transistor 17 is in the off state.

As the transistor 22 enters the on state, the low-amplitude control signal SCk having the gamma voltage VG(k−1) is supplied to the gate of the transistor 16. In this case, since the gamma voltage VG(k−1) is higher than the gamma voltage Vk, the transistor 16 enters the off state.

Therefore, as the transistor 18 is in the on state and the transistors 16 and 17 are in the off state, as shown by the thick solid line in FIG. 7B, the reference voltage VIk is applied to the gate of the transistor 11 of the differential pair, while the voltage of the output node nd0 is supplied to the gate of the transistor 12 via the transistor 18 and the capacitor Ca.

As a result, the offset voltage Voff occurring in the voltage of the output node nd0 is canceled out by the offset voltage Voff held in the capacitor Ca.

Therefore, the gamma buffer GBk becomes capable of outputting a highly accurate voltage with the offset portion (Voff) removed, that is, the gamma voltage VGk having a voltage value equal to the voltage value of the input reference voltage VIk.

Furthermore, in the gamma buffer GBk, the control signal output circuit A2_*k*_1 performs on-to-off control on the transistor 16, which holds the voltage accumulated at the node nd2 in the first process where one terminal of the capacitor Ca and the gate of the transistor 12 of the differential pair are connected, using the low-amplitude control signal SCk. This transistor 16 has the most significant impact on the offset voltage among the transistors involved in the offset cancellation operation.

In other words, in a case where the control signal output circuit A2_*k*_1 sets the transistor 16 to the on state with the switch signals S1 and XS1, the control signal output circuit A2_*k*_1 supplies the low-amplitude control signal SCk having the gamma voltage VG(k+1) to the gate of the transistor 16 via the transistor 21. On the other hand, in a case of setting the transistor 16 to the off state, the control signal output circuit A2_*k*_1 supplies the low-amplitude control signal SCk having the gamma voltage VG(k−1) to the gate of the transistor 16 via the transistor 22.

Therefore, the transistor 16 is controlled on and off by the low-amplitude control signal SCk including the gamma voltages VG(k+1) and VG(k−1), which has a smaller amplitude compared to a high-amplitude control signal including the power supply voltages VDD and VSS.

As a result, during the transition from the first process to the second process shown in FIG. 6, the feedthrough caused by the parasitic capacitance of the transistor 16 is reduced compared to the case where the transistor 16 is transitioned from on state to off state with a high-amplitude (VDD to VSS) control signal. This makes it possible to output a highly accurate gamma voltage VGk.

It should be noted that the feedthrough here refers to a phenomenon where the charge in the parasitic capacitance of the transistor 16 fluctuates due to the capacitive coupling between the gate and drain (source) of the transistor 16, causing the voltage accumulated in the node nd2 to fluctuate. In particular, when the amplitude of the control signal supplied to the gate of the transistor 16 is large, the charge fluctuation in the above-mentioned parasitic capacitance also becomes large during the level transition of this control signal, which results in a malfunction that causes an offset voltage in the voltage held at the node nd2.

Therefore, in the gamma buffer GBk, the control signal output circuit A2_*k*_1 generates a binary signal representing the gamma voltages VG(k+1) and VG(k−1), which have a voltage difference lower than the power supply voltage VDD, as two values (logic levels 0 and 1), as the low-amplitude control signal SCk for controlling the transistor 16.

As a result, the amount of charge fluctuation with respect to the node nd2 due to capacitive coupling in the transistor 16 is suppressed, so it becomes possible to output the highly accurate gamma voltage VGk with suppressed offset voltage associated with the amount of charge fluctuation.

Thus, according to the gamma buffer GBk shown in FIG. 5, it is possible to generate a gamma voltage according to the desired gamma characteristic with high accuracy, without increasing the size of each transistor constituting the buffer.

Therefore, according to the gradation voltage generation circuit 122 shown in FIG. 3, it is possible to generate the gradation voltages VR0 to VR(n−1) as multiple level voltages according the desired gamma characteristic while suppressing the circuit area.

It should be noted that, in the above example, the low-amplitude control signal SCk is generated using the gamma voltages VG(k+1) and VG(k−1), but the low-amplitude control signal SCk may also be generated using the gamma voltage VGk output by the gamma buffer GBk and the gamma voltage VG(k+1).

Furthermore, in the embodiment of the switch signals (S1, XS1, S2, XS2 and SCk) related to the offset cancel operation of the gamma buffer GBk shown in FIGS. 5 and 6, the transistors 17 and 18 are controlled on/off by high-amplitude control signals XS2 and S2. However, similar to the low-amplitude control signal Sck that controls the transistor 16 on and off, the control signal output circuit A2_*k*_1 can also be configured to convert control signals XS2 and S2 into low-amplitude control signals to turn the transistors 17 and 18 on and off. However, in this case, the circuit area of the control signal output circuit A2_*k*_1 increases. In the present invention, the description will be given with an embodiment in which the circuit scale of the control signal output circuit is minimized.

Figure 8:
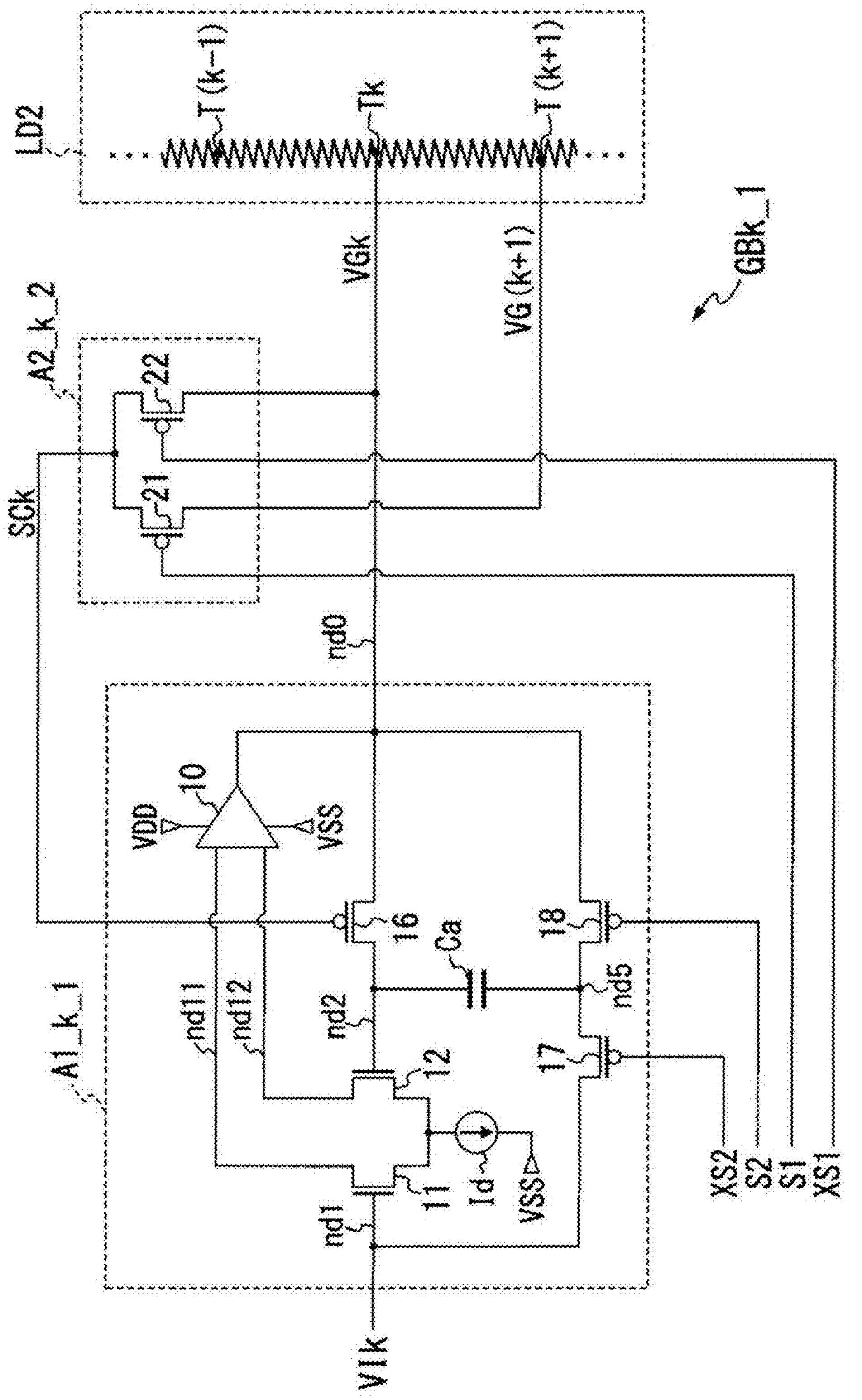
FIG. 8 is a circuit diagram showing the configuration of the gamma buffer GBk_1 as the first modification example of the gamma buffer GBk.

FIG. 8 is a circuit diagram showing an example of the internal configuration of the $k^{th}$ (k is an integer from 1 to m−2) gamma buffer GBk extracted from the gamma buffers GB0 to GB(m−1) in FIG. 4B.

FIG. 8 is a circuit diagram showing the configuration of the gamma buffer GBk_1 as the first modification example of the gamma buffer GBk in view of this point. It should be noted that the gamma buffer GBk_1 in FIG. 8 is also any of the gamma buffers on the higher voltage side among the gamma buffers GB0 to GB(m−1) in FIG. 4B.

Besides, in the configuration shown in FIG. 8, the control signal output circuit A2_*k*_2 is adopted instead of the control signal output circuit A2_*k*_1 shown in FIG. 5, and the other configurations are the same as those shown in FIG. 5.

Therefore, the configuration of the control signal output circuit A2_*k*_2 and the effects of adopting the control signal output circuit A2_*k*_2 will be described below.

The control signal output circuit A2_*k*_2 includes transistors 21 and 22, similar to the control signal output circuit A2_*k*_1.

However, in the control signal output circuit A2_*k*_2, one terminal of the source and drain of the transistor 22 is connected to the tap Tk of the resistor string LD2. In other words, the gamma voltage VGk output by the gamma buffer GBk_1, rather than the gamma voltage VG(k−1), is applied to the drain of the transistor 22.

Therefore, with such a configuration, in a case where the transistor 16 is set to the on state by the switch signals S1 and XS1, in the control signal output circuit A2_*k*_2, the low-amplitude control signal SCk having the gamma voltage VG(k+1) is supplied to the gate of the transistor 16 via the transistor 21, similar to the control signal output circuit A2_*k*_1.

On the other hand, in a case where the transistor 16 is set to the off state, in the control signal output circuit A2_*k*_2, the low-amplitude control signal SCk having the gamma voltage VGk is supplied to the gate of the transistor 16 via the transistor 22.

Thus, compared to the case of adopting the control signal output circuit A2_*k*_1 shown in FIG. 5, the on-off control of the transistor 16 is performed with the low-amplitude control signal SCk having an even smaller amplitude, so the feedthrough can be further reduced.

Therefore, according to the configuration of the gamma buffer GBk_1 shown in FIG. 8, it is possible to output a highly accurate gamma voltage VGk.

Figure 9:
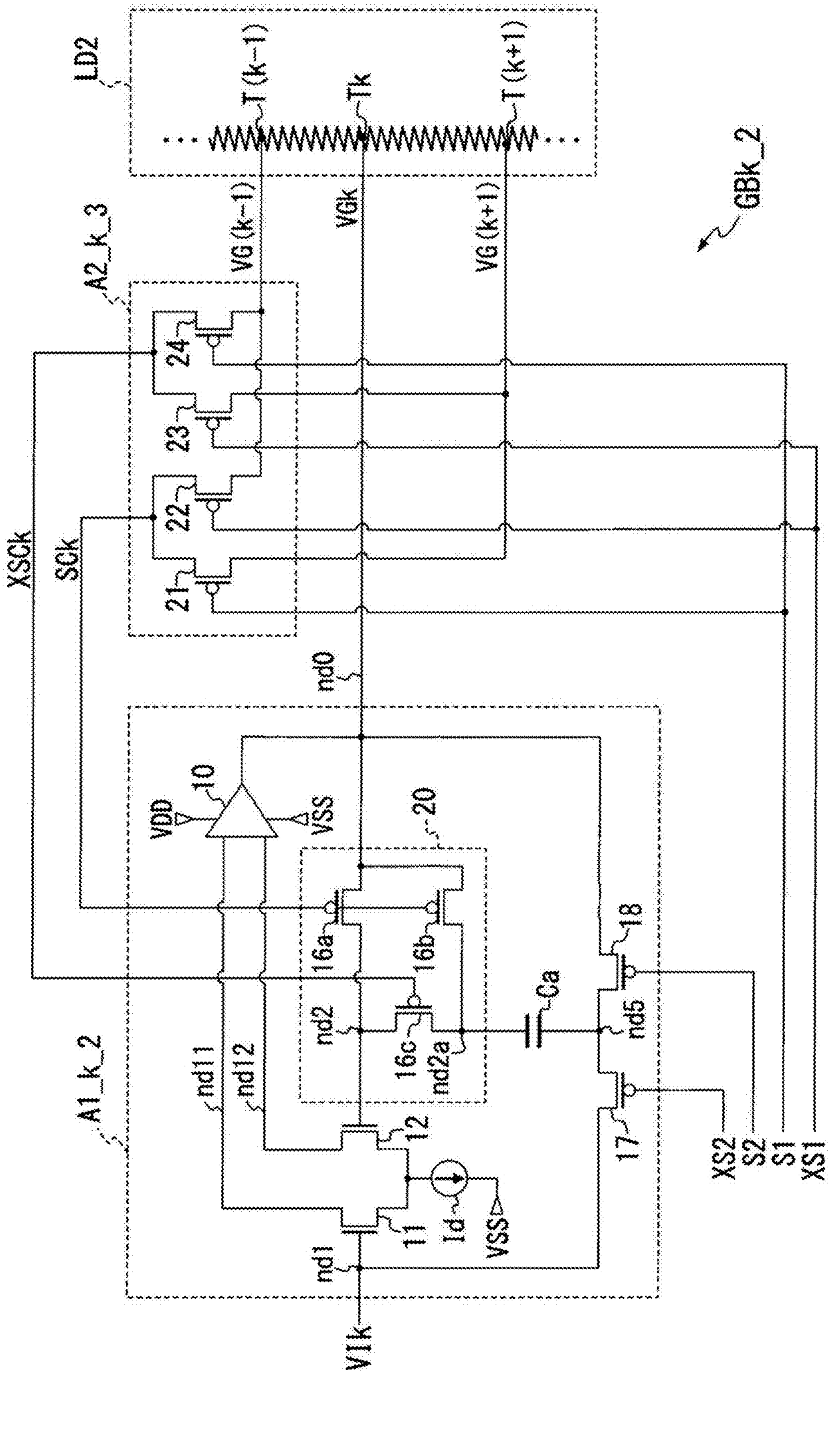
FIG. 9 is a circuit diagram showing the configuration of the gamma buffer GBk_2 as the second modification example of the gamma buffer GBk.

FIG. 9 is a circuit diagram showing the configuration of the gamma buffer GBk_2 as the second modification example of the gamma buffer GBk. As described above, there is a problem that an offset voltage is generated in the voltage held at the node nd2 due to the coupling of the parasitic capacitance between the gate and drain (source) of the transistor constituting the switching element. In addition to this capacitive coupling, there is also a problem that when the transistor constituting the switching element changes from the on state to the off state, the charge in the channel moves to the drain side or the source side as the channel disappears, which causes the offset voltage to increase. FIG. 9 shows a configuration example of a gamma buffer that improves not only the above-mentioned capacitive coupling but also the problem associated with the movement of charge in the channel, and makes it possible to output a voltage with even higher accuracy.

It should be noted that in the configuration shown in FIG. 9, the offset cancellation amplifier A1_*k*_2 is adopted instead of the above-mentioned offset cancellation amplifier A1_*k*_1, and the control signal output circuit A2_*k*_3 is adopted instead of the above-mentioned control signal output circuit A2_*k*_1.

In this case, the configuration in the offset cancellation amplifier A1_*k*_2 is the same as the configuration shown in FIG. 5, except a switch circuit 20 is adopted instead of the transistor 16 shown in FIG. 5.

Therefore, the configuration of the switch circuit 20 and the control signal output circuit A2_*k*_3, and the effects of adopting the switch circuit 20 and the control signal output circuit A2_*k*_3 will be described below.

The switch circuit 20 includes P-channel type transistors 16*a*, 16*b*, and 16*c*.

The transistor 16*a* has one terminal of the source and drain connected to the output node nd0, and the other terminal of the source and drain connected to the gate of the transistor 12 via the node nd2. In addition, the transistor 16*a* receives the low-amplitude control signal SCk supplied from the control signal output circuit A2_*k*_3 at the gate.

The transistor 16*b* has one terminal of the source and drain connected to the output node nd0, and the other terminal of the source and drain connected to one terminal of the capacitor Ca via the node nd2*a*. In addition, the transistor 16*b* receives the above-mentioned low-amplitude control signal SCk at the gate.

The transistor 16*c* has one terminal of the source and drain connected to the node nd2, and the other terminal of the source and drain connected to one terminal of the capacitor Ca via the node nd2*a*. In addition, the transistor 16*c* receives an inverted low-amplitude control signal XSCk supplied from the control signal output circuit A2_*k*_3 at the gate.

The control signal output circuit A2_*k*_3 includes P-channel type transistors 23 and 24, along with the transistors 21 and 22 included in the control signal output circuit A2_*k*_1.

The transistor 23 receives the gamma voltage VG(k+1) output to the tap T(k+1) of the resistor string LD2 by the gamma buffer GB(k+1) at one terminal of the source and drain, and receives the switch signal XS1 supplied from the control circuit CNT at the gate.

The transistor 24 receives the gamma voltage VG(k−1) output to the tap T(k−1) of the resistor string LD2 by the gamma buffer GB(k−1) at one terminal of the source and drain, and receives the switch signal S1 supplied from the control circuit CNT at the gate. Furthermore, the other terminals of the respective sources and drains of the transistors 23 and 24 are commonly connected to the gate of the transistor 16*c*.

In other words, in the control signal output circuit A2_*k*_3, the transistors 23 and 24 generate the inverted low-amplitude control signal XSCk by inverting the logic level of the low-amplitude control signal SCk generated by the transistors 21 and 22.

In other words, in a case where the transistors 21 and 22 of the control signal output circuit A2_*k*_3 receive the switch signal S1 of logic level 1 and the switch signal XS1 of logic level 0, the transistors 21 and 22 supply the low-amplitude control signal SCk having the gamma voltage VG(k−1) to the gates of the transistors 16*a* and 16*b*. As a result, the transistors 16*a* and 16*b* are controlled to be in the off state. On the other hand, in a case of receiving the switch signal S1 of logic level 0 and the switch signal XS1 of logic level 1, the transistors 21 and 22 supply the low-amplitude control signal SCk having the gamma voltage VG(k+1) to the gates of the transistors 16*a* and 16*b*. As a result, the transistors 16*a* and 16*b* are controlled to be in the on state.

In addition, in a case where the transistors 23 and 24 of the control signal output circuit A2_*k*_3 receive the switch signal S1 of logic level 1 and the switch signal XS1 of logic level 0, the transistors 23 and 24 supply a signal having the gamma voltage VG(k+1) as the inverted low-amplitude control signal XSCk to the gate of the transistor 16*c*. As a result, the transistor 16*c* is controlled to be in the on state. On the other hand, in a case of receiving the switch signal S1 of logic level 0 and the switch signal XS1 of logic level 1, the transistors 23 and 24 supply the inverted low-amplitude control signal XSCk having the gamma voltage VG(k−1) to the gate of the transistor 16*c*. As a result, the transistor 16*c* is controlled to be in the off state.

That is to say, in a case where the transistors 16*a* and 16*b* are set to the on state by the low-amplitude control signal SCk and the inverted low-amplitude control signal XSCk, the transistor 16*c* is set to the off state. On the other hand, in a case where the transistors 16*a* and 16*b* are set to the off state, the transistor 16*c* is set to the on state. It should be noted that in FIG. 9, the gate of the transistor 12 is connected to the node nd2, and one terminal of the capacitor Ca is connected to the node nd2*a*. However, the gate of the transistor 12 and one terminal of the capacitor Ca may be commonly connected to either one of the nodes nd2 and nd2*a*.

Figure 10A:
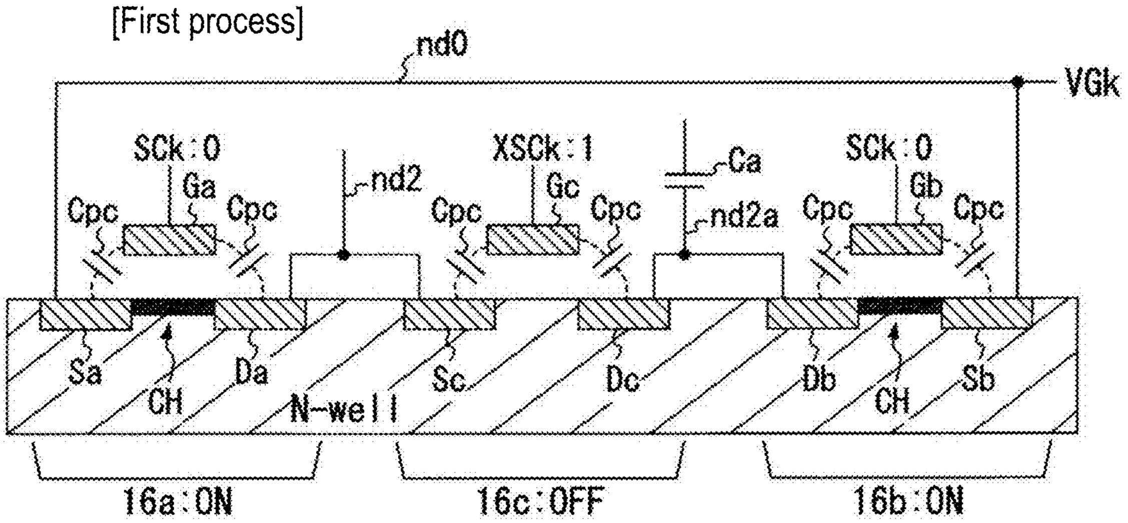
FIG. 10A is a cross-sectional view schematically showing the cross-sectional structure of each of the transistors 16*a* to 16*c*, the mutual connection configuration, and the respective states in the first process by the gamma buffer GBk_2.
Figure 10B:
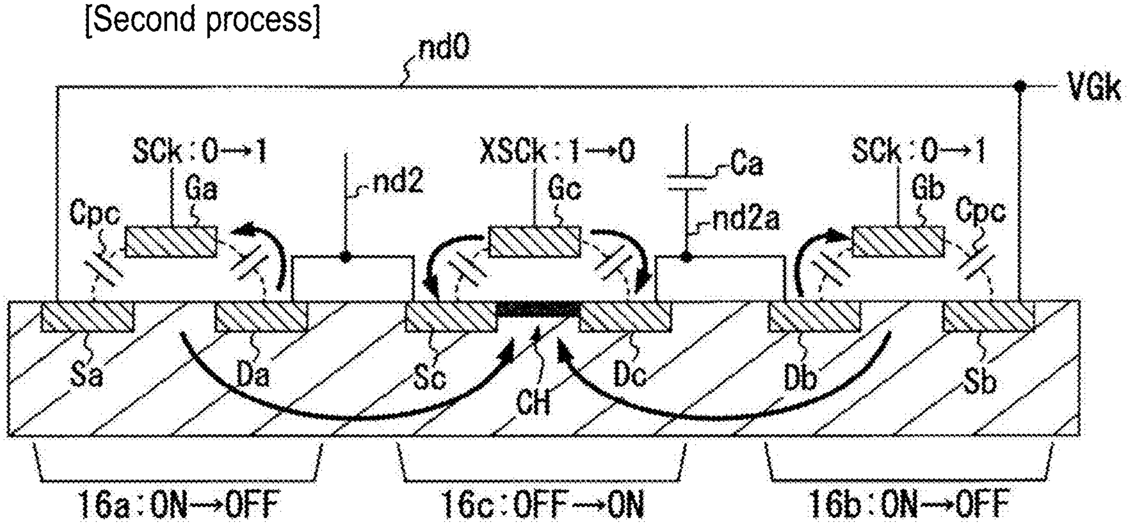
FIG. 10B is a cross-sectional view schematically showing the cross-sectional structure of each of the transistors 16*a* to 16*c*, the mutual connection configuration, and the respective states in the first process by the gamma buffer GBk_2.

Next, the effect of the switch circuit 20 (16*a* to 16*c*) shown in FIG. 9 will be described with reference to FIG. 10A and FIG. 10B. It should be noted that FIG. 10A and FIG. 10B are cross-sectional views schematically showing the cross-sectional structure of each of the transistors 16*a* to 16*c* and the mutual connection configuration. In addition, FIG. 10A shows the state of each transistor in the first process shown in FIG. 6, and FIG. 10B shows the state of each transistor during the transition from the first process to the second process. It should be noted that the source and drain of each of the transistors 16*a* to 16*c* in the switch circuit 20 may be interchanged depending on the magnitude of the respective voltages. However, for the sake of explanation, the terminals of the transistors 16*a* and 16*b* connected to the output node nd0 are referred to as sources, the terminals of the transistors 16*a* and 16*b* connected to the terminal of the transistor 16*b* are referred to as drains, and the two terminals of the transistor 16*c* connected to the transistors 16*a* and 16*b* are referred to as source and drain, respectively.

[First Process]

First, in the first process, as shown in FIG. 10A, the transistor 16*a* enters the on state by receiving the low-amplitude control signal SCk of logic level 0 at the gate Ga, forming a channel CH between the source region Sa and the drain region Da. The transistor 16*b* also enters the on state by receiving the low-amplitude control signal SCk of logic level 0 at the gate Gb, forming a channel CH between the source region Sb and the drain region Db. It should be noted that in the first process, the transistor 16*c* enters the off state as the transistor 16*c* receives the inverted low-amplitude control signal XSCk of logic level 1 at the gate Gc. Therefore, no channel is formed between the source region Sc and the drain region Dc of the transistor 16*c*.

According to this first process, the voltage of the output node nd0 is supplied to the gate of the transistor 12 via the node nd2 by the transistor 16*a*, and the voltage of the output node nd0 is supplied to one terminal of the capacitor Ca via the node nd2*a* by the transistor 16*b*. In this case, since the reference voltage VIk is applied to the other terminal of the capacitor Ca via the transistor 17 in the first process, the offset voltage occurring at the output node nd0 is held in this capacitor Ca, similar to the configuration shown in FIG. 5 and FIG. 7A.

[Second Process]

When shifting from the first process to the second process, as shown in FIG. 10B, the low-amplitude control signal SCk supplied to the gate Ga of the transistor 16*a* and the gate Gb of the transistor 16*b* transitions from the voltage [VG(k+1)] corresponding to logic level 0 to the voltage [VG(k−1)] corresponding to logic level 1. As a result, both the transistors 16*a* and 16*b* transition from the on state to the off state. Furthermore, as the inverted low-amplitude control signal XSCk supplied to the gate Gc of the transistor 16*c* transitions from the voltage [VG(k−1)] corresponding to logic level 1 to the voltage [VG(k+1)] corresponding to logic level 0, the transistor 16*c* transitions from the off state to the on state.

During the voltage transition at the gates of the transistors 16*a* to 16*c* as described above, charge moves in the direction indicated by the thick solid lines in FIG. 10B via the parasitic capacitance Cpc that exists between each gate and source, as well as between each gate and drain.

In other words, due to the parasitic capacitive coupling of the transistors during switching, charge moves from the drain region Da to the gate Ga of the transistor 16*a*. Additionally, charge moves from the drain region Db to the gate Gb of the transistor 16*b*. Furthermore, charge moves from the gate Gc toward both the source region Sc and the drain region Dc of the transistor 16*c*.

Therefore, the voltage fluctuation at the node nd2 associated with the charge transfer from the drain region Da to the gate Ga of the transistor 16*a* is offset by the voltage fluctuation at the node nd2 associated with the charge transfer from the gate Gc to the source region Sc of the transistor 16*c*. Furthermore, the voltage fluctuation at the node nd2*a* associated with the charge transfer from the drain region Db to the gate Gb of the transistor 16*b* is offset by the voltage fluctuation at the node nd2*a* associated with the charge transfer from the gate Gc to the source region Sc of the transistor 16*c*. Thus, the charge transfer caused by the parasitic capacitive coupling of the transistors during switching has almost no effect on the charge accumulated in the capacitor Ca, and the voltage fluctuation at the node nd2*a* can be suppressed.

Additionally, due to the transition between the on state and the off state of the transistors during switching, the channel CH is generated and disappears, which also causes charge transfer. In FIG. 10A and FIG. 10B, the charge accumulated in the channel CH of the transistors 16*a* and 16*b*, which are in the on state during the first process, disperses and moves toward the drain region side and the source region side of each transistor when the transistors change to the off state in the second process and the channel CH disappears. In this case, about half of the charge in the channel CH of the transistor 16*a* moves toward the drain region Da side, as indicated by the thick solid line in FIG. 10B, and further moves into the channel CH of the transistor 16*c*, which is in the on state during the second process. Also, about half of the charge in the channel CH of the transistor 16*b* moves toward the drain region Db side, as indicated by the thick solid line in FIG. 10B, and further moves into the channel CH of the transistor 16*c*, which is in the on state during the second process.

In other words, about half of the charge in the channel CH of the transistor 16*a* in the first process moves directly through the node nd2 to the channel CH of the transistor 16*c* in the second process, and about half of the charge in the channel CH of the transistor 16*b* in the first process also moves directly through the node nd2*a* to the channel CH of the transistor 16*c* in the second process. Consequently, the charge transfer within the channel CH of the transistors during switching has almost no effect on the charge accumulated in the capacitor Ca, and the voltage fluctuation at the node nd2*a* can be suppressed.

As a result, during the transition from the first process to the second process, the voltage fluctuation of the voltage at one terminal of the capacitor Ca (voltage at the node nd2*a*) and the voltage at the node nd2, which is caused by the switching operation of each of the transistors 16*a* to 16*c* included in the offset cancellation circuit, can be suppressed and maintained in the state after the completion of the first process. Therefore, it is possible to perform highly accurate offset cancellation without increasing the capacitance of the capacitor Ca.

That is, in the configuration shown in FIG. 5, the on-off control of the transistor 16 based on the low-amplitude control signal SCk with a small amplitude can suppress the voltage fluctuation (increase in offset voltage) caused by the capacitive coupling occurring at the node nd2 during the transition from the first process to the second process. However, when the transistor 16 transitions from the on state to the off state, about half of the charge in the channel moves to the node nd2 side following the disappearance of the channel of the transistor 16, which results in voltage fluctuation (increase in offset voltage) caused by the addition of the charge to the charge accumulated in the capacitor Ca.

Therefore, by adopting the control signal output circuit A2_*k*_3 and the switch circuit 20 as shown in FIG. 9, the two problems of voltage fluctuation due to capacitive coupling and voltage fluctuation due to charge transfer within the channel CH are resolved. Furthermore, by adopting the configuration shown in FIG. 9, it becomes possible to achieve a highly accurate offset cancellation operation with reduced offset voltage even if the capacitor Ca has a small capacitance. Of course, it is also possible to achieve similar effects as in FIG. 9 by adopting the control signal output circuit A2_*k*_3 and the switch circuit 20 for the gamma buffer GBk_1 in FIG. 8.

Figure 11:
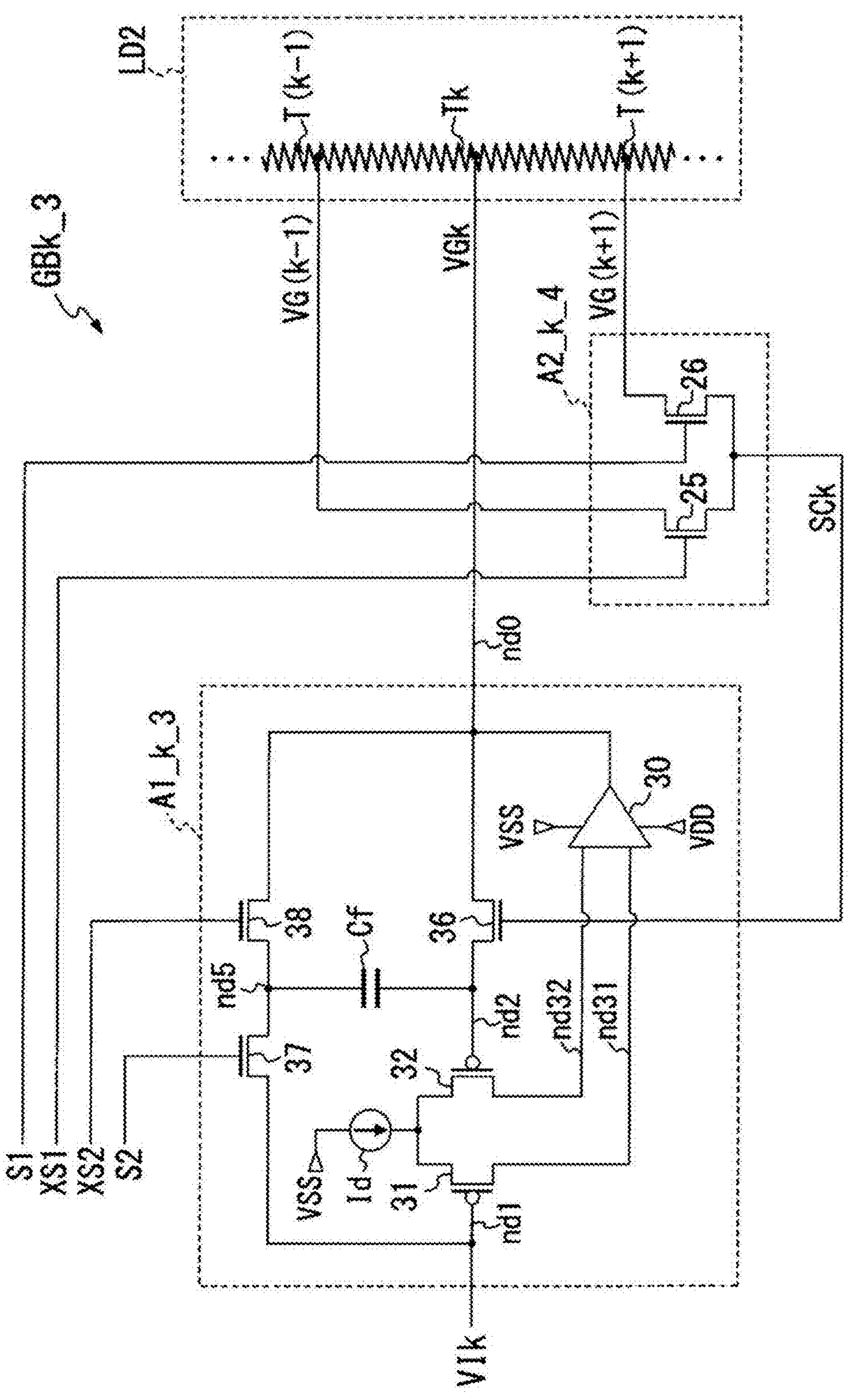
FIG. 11 is a circuit diagram showing the configuration of the gamma buffer GBk_3 as the third modification example of the gamma buffer GBk.

FIG. 11 is a circuit diagram showing the configuration of the gamma buffer GBk_3 as the third modification example of the gamma buffer GBk shown in FIG. 5.

It should be noted that the gamma buffer GBk_3 shown in FIG. 11 is configured by respectively changing the transistor group (11, 12, 16 to 18) constituting the gamma buffer GBk shown in FIG. 5 to the reverse conductive type. Furthermore, in the configuration shown in FIG. 11, an amplification stage 30 is employed instead of the amplification stage 10 shown in FIG. 5, and a capacitor Cf is employed instead of the capacitor Ca, with the respective connection configurations being the same as those shown in FIG. 5.

In other words, in the configuration shown in FIG. 11, a control signal output circuit A2_*k*_4 is employed instead of the control signal output circuit A2_*k*_1 shown in FIG. 5, and an offset cancellation amplifier A1_*k*_3 is employed instead of the offset cancellation amplifier A1_*k*_1.

In this case, in the offset cancellation amplifier A1_*k*_3, the N-channel type transistors 11 and 12 shown in FIG. 5 constituting the differential pair are replaced with P-channel type transistors 31 and 32.

The differential pair including the transistors 31 and 32 sends a current pair corresponding to the difference between the reference voltage VIk, which is the voltage at the node nd1, and the voltage at the node nd2, to the nodes nd31 and nd32. The amplification stage 30 operates by receiving the power supply voltage VDD and the power supply voltage VSS, and outputs to the output node nd0 a current corresponding to the difference between the currents flowing through the nodes nd31 and nd32, so as to make the voltage at the output node nd0 match the reference voltage VIk.

The configuration shown in FIG. 11 is suitable for gamma buffers responsible for outputting the gamma voltage VGk on the lower voltage side, which have voltage values closer to the power supply voltage VSS than to the power supply voltage VDD, among the gamma buffers GB0 to GB(m−1).

It should be noted that while the gamma buffer GBk shown in FIG. 5 is equipped with an offset cancellation circuit including the transistors 16 to 18 and the capacitor Ca, the offset cancellation circuit is not limited to the configuration including the transistors 16 to 18 and the capacitor Ca.

Figure 12:
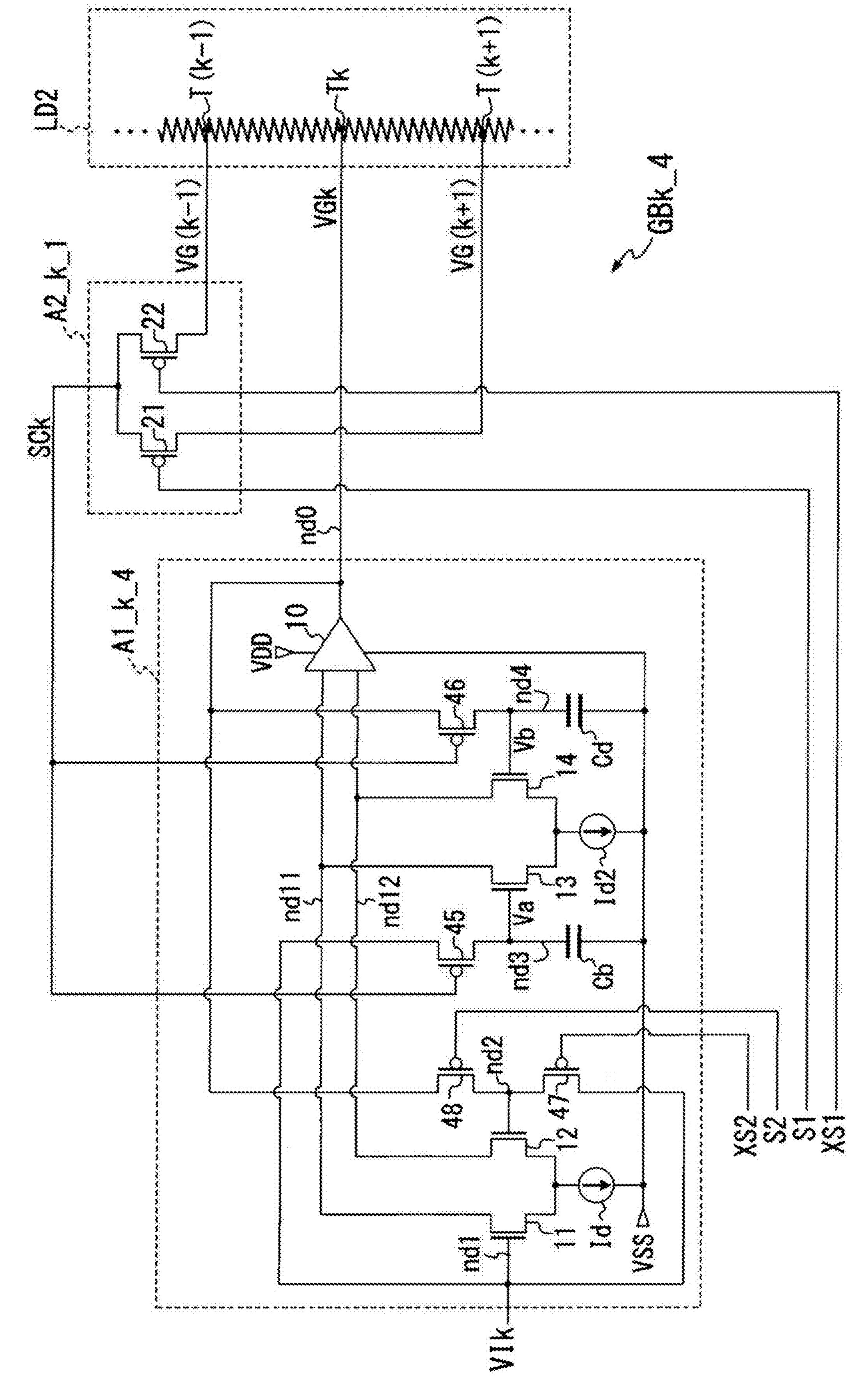
FIG. 12 is a circuit diagram showing the configuration of the gamma buffer GBk_4 as the fourth modification example of the gamma buffer GBk.

FIG. 12 is a circuit diagram showing the configuration of the gamma buffer GBk_4 as the fourth modification example of the gamma buffer GBk shown in FIG. 5, in view of this point.

In the configuration shown in FIG. 12, an offset cancellation amplifier A1_*k*_4 is employed instead of the offset cancellation amplifier A1_*k*_1 shown in FIG. 5, while the control signal output circuit A2_*k*_1 is the same as that shown in FIG. 5.

The offset cancellation amplifier A1_*k*_4 adopts P-channel type transistors 45 to 48, capacitors Cb and Cd, a current source Id2, and N-channel type transistors 45 and 46 forming a differential pair, instead of the transistors 16 to 18 and the capacitor Ca shown in FIG. 5 as the offset cancellation circuit. It should be noted that the differential pair (11, 12), the current source Id, and the amplification stage 10 as the operational amplifier are the same as those shown in FIG. 5.

The source of the transistor 13 is connected to the current source Id2, and the drain is connected to the node nd11. The gate of the transistor 13 is connected to one terminal of the capacitor Cb via the node nd3. The power supply voltage VSS is applied to the other terminal of the capacitor Cb.

The source of the transistor 14 is connected to the current source Id2, and the drain is connected to the node nd12. The gate of the transistor 14 is connected to one terminal of the capacitor Cd via the node nd4. The power supply voltage VSS is applied to the other terminal of the capacitor Cd. It should be noted that the transistors 13 and 14 operate as a differential pair for offset cancellation.

The transistor 45 receives the low-amplitude control signal SCk at the gate, and enters the off state in a case where the low-amplitude control signal SCk represents, for example, logic level 1, while entering the on state in a case where the low-amplitude control signal SCk represents logic level 0. During the on state, the transistor 45 connects the node nd1 and the node nd3.

The transistor 46 receives the low-amplitude control signal SCk at the gate, and enters the off state in a case where the low-amplitude control signal SCk represents, for example, logic level 1, while entering the on state in a case where the low-amplitude control signal SCk represents logic level 0. During the on state, the transistor 46 connects the node nd4 and the output node nd0.

The transistor 47 receives the switch signal XS2 at the gate, and enters the off state while the switch signal XS2 is, for example, at logic level 1, while entering the on state while the switch signal XS2 is at logic level 0. During the on state, the transistor 47 connects the node nd1 and the node nd2.

The transistor 48 receives the switch signal S2, and enters the off state while the switch signal S2 is, for example, at logic level 1, while entering the on state while the switch signal S2 is at logic level 0. During the on state, the transistor 48 connects the output node nd0 and the node nd2.

Next, the offset cancellation operation performed by the offset cancellation circuit (45 to 48, Cb and Cd, Id2, 45 and 46) shown in FIG. 12 will be described in the order of the first process and the second process shown in FIG. 6.

[First Process]

Figure 13A:
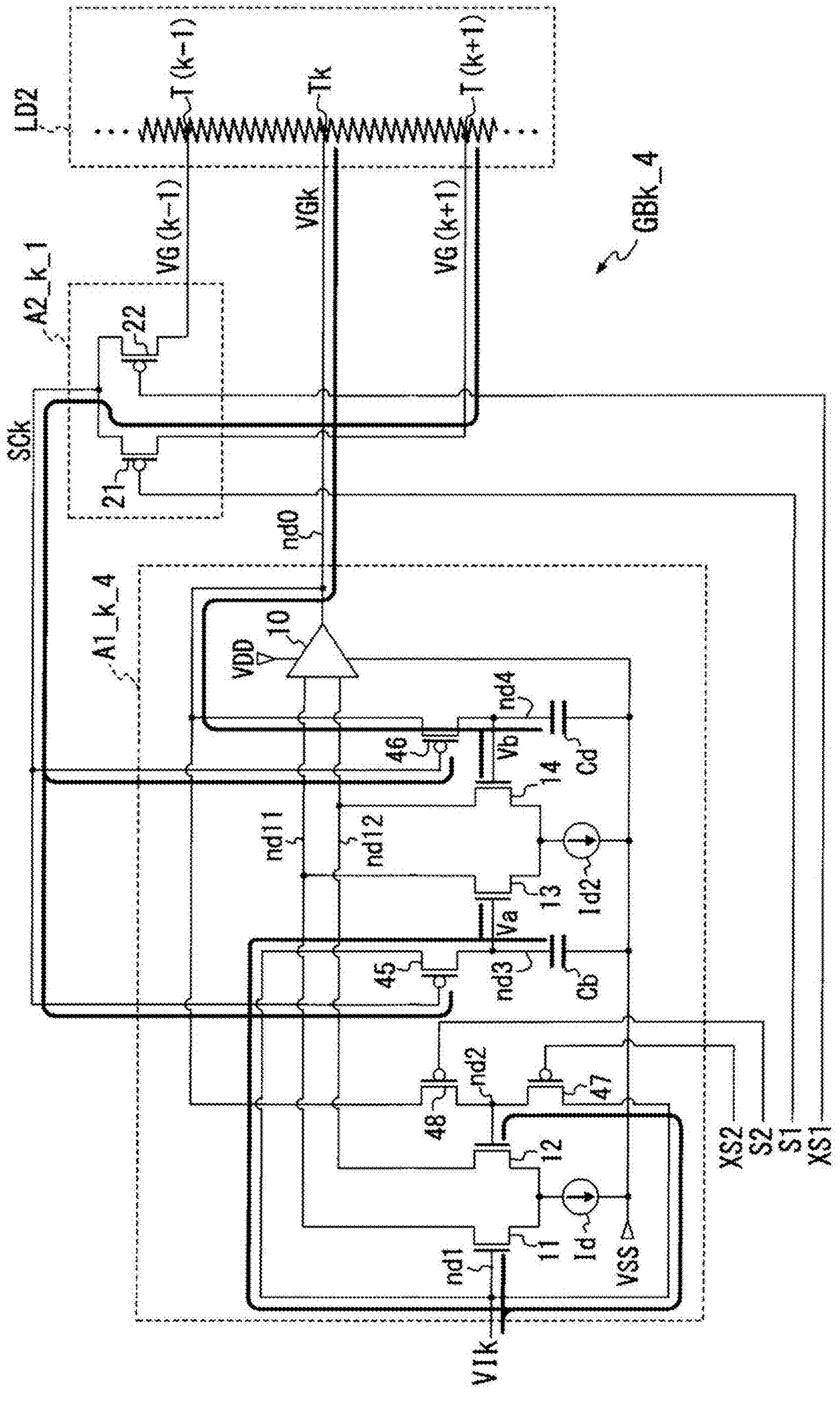
FIG. 13A is a schematic circuit diagram showing on-off states of each transistor of the gamma buffer GBk_4 in the first process, and the current path indicated by a thick solid line.

FIG. 13A is a schematic circuit diagram showing the current path during the first process of the gamma buffer shown in FIG. 12, with the current path indicated by a thick solid line.

As shown in FIG. 13A, in the first process, in response to the switch signal S2, the transistor 48 enters the off state, while in response to the switch signal XS2, the transistor 47 enters the on state. Thus, the gates of the transistors 11 and 12 of the differential pair are connected, as indicated by the thick solid line.

Also, in the first process, in response to the switch signal S1, the transistor 21 enters the on state, while in response to the switch signal XS1, the transistor 22 enters the off state. Thus, the low-amplitude control signal SCk having the gamma voltage VG(k+1) corresponding to logic level 0 is supplied to the gates of the transistors 45 and 46, as indicated by the thick solid line. Consequently, the transistor 45 enters the on state, and as indicated by the thick solid line, the reference voltage VIk is applied to the gate of the transistor 13 and one terminal of the capacitor Cb via the transistor 45 and the node nd3, and the capacitor Cb is charged by the reference voltage VIk.

As a result, the voltage Va at one terminal of the capacitor Cb becomes:

$$Va=VIk,$$

and this voltage Va is accumulated in the capacitor Cb.

Furthermore, in response to the low-amplitude control signal SCk having the gamma voltage VG(k+1), the transistor 46 enters the on state, and as indicated by the thick solid line, the voltage at the output node nd0 is applied to the gate of the transistor 14 and one terminal of the capacitor Cd via the transistor 46 and the node nd4. At this time, the voltage at the output node nd0 is essentially equal to the reference voltage VIk, but if an offset voltage occurs at the output node nd0, a voltage with the offset voltage Voff superimposed on VIk occurs at the output node nd0.

As a result, the voltage Vb at one terminal of the capacitor Cd becomes:

$$Vb = VIk + Voff,$$

and this voltage Vb is accumulated in the capacitor Cd.

[Second Process]

Figure 13B:
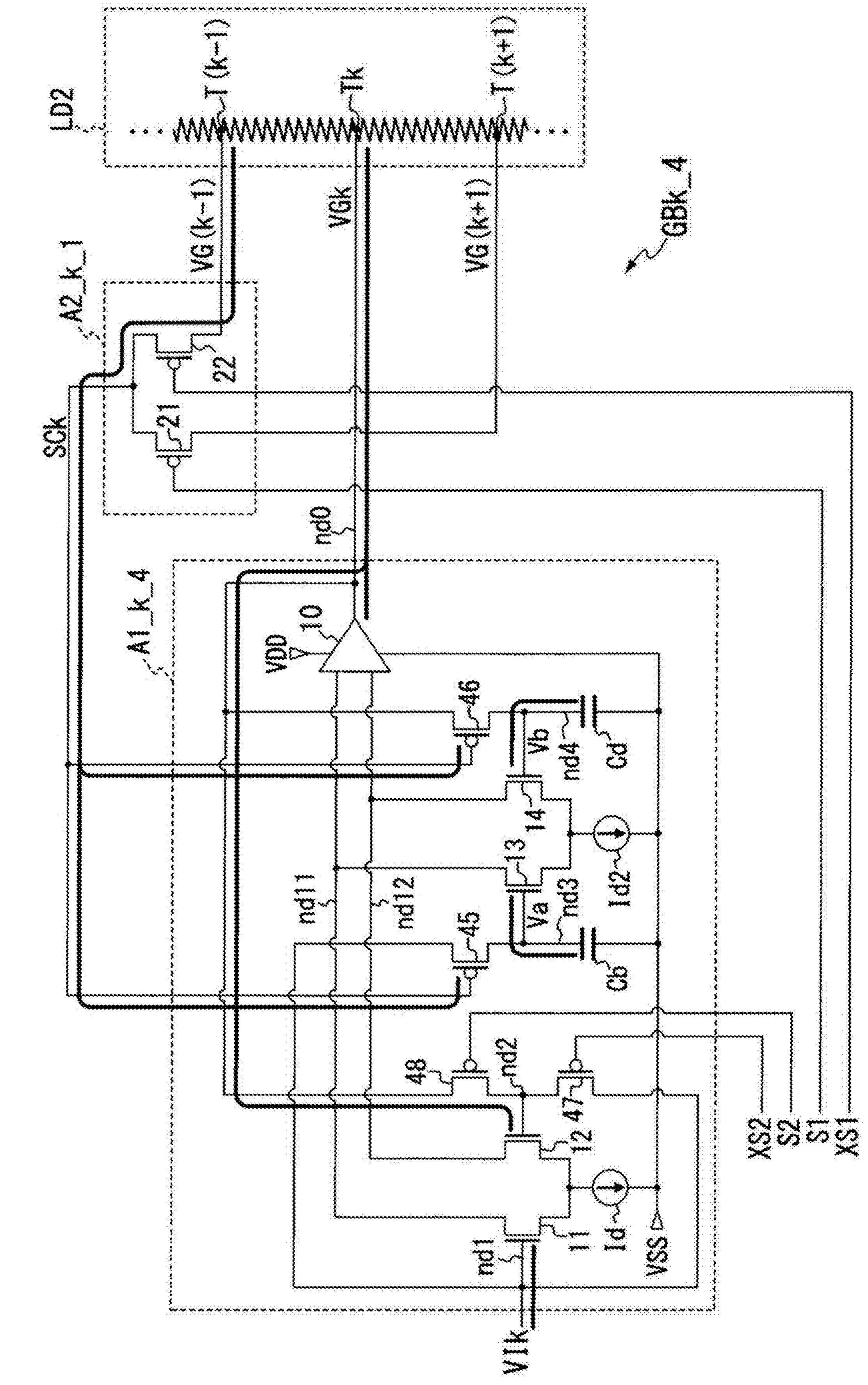
FIG. 13B is a schematic circuit diagram showing on-off states of each transistor of the gamma buffer GBk_4 during transition from the first process to the second process, and the current path indicated by a thick solid line.

FIG. 13B is a schematic circuit diagram showing the current path during the second process of the gamma buffer shown in FIG. 12, with the current path indicated by a thick solid line.

As shown in FIG. 13B, in the second process, in response to the switch signal XS2, the transistor 47 enters the off state, while in response to the switch signal S2, the transistor 48 enters the on state. Thus, as indicated by the thick solid line, the voltage at the output node nd0 is supplied to the gate of the transistor 12 of the differential pair via the transistor 48 and the node nd2.

Also, in the second process, in response to the switch signal XS1, the transistor 22 enters the on state, while in response to the switch signal S1, the transistor 21 enters the off state. Thus, the low-amplitude control signal SCk having the gamma voltage VG(k−1) corresponding to logic level 1 is supplied to the gates of the transistors 45 and 46, as indicated by the thick solid line. Consequently, the transistors 45 and 46 enter the off state, and the voltages accumulated in the capacitors Cb and Cd are held.

Therefore, the voltage Va (=VIk) held in the capacitor Cb is supplied to the gate of the transistor 13, and the voltage Vb (=VIk+Voff) held in the capacitor Cd is supplied to the gate of the transistor 14.

As a result, the differential pair (13, 14) continues to flow a current pair corresponding to the difference between the voltage Va (=VIk) and the voltage Vb (=VIk+Voff), that is, the offset voltage Voff, to the nodes nd11 and nd12, following the first process.

In this case, since the differential pair (11, 12) flows a current pair corresponding to the difference between the input reference voltage VIk and the voltage at the output node nd0 to the nodes nd11 and nd12, this current pair is superimposed with the current pair corresponding to the offset mentioned above. Because the current pair output from the differential pair (13, 14) to the nodes nd11 and nd12 is the same as in the first process, the current pair in the second process also acts to make the current pair output from the differential pair (11, 12) to the nodes nd11 and nd12 the same as in the first process. Therefore, due to the amplification effect of the amplification stage 10, a highly accurate gamma voltage VGk having a voltage value equal to the reference voltage VIk, with the offset portion removed, is generated at the output node nd0.

It should be noted that in the configuration shown in FIG. 12, the on-off control of the transistors 45 and 46 for offset cancellation control is performed with the low-amplitude control signal SCk. Therefore, even in a case of adopting the offset cancellation circuit (45 to 48, Cb and Cd, Id2, 45 and 46) as shown in FIG. 12, the on-off control of the transistors 45 and 46 based on the low-amplitude control signal SCk with a small amplitude can suppress voltage fluctuation due to capacitive coupling occurring at each of the nodes nd3 and nd4 during the transition from the first process to the second process, thereby generating a highly accurate gamma voltage VGk with reduced offset voltage.

Example 2

Figure 14:
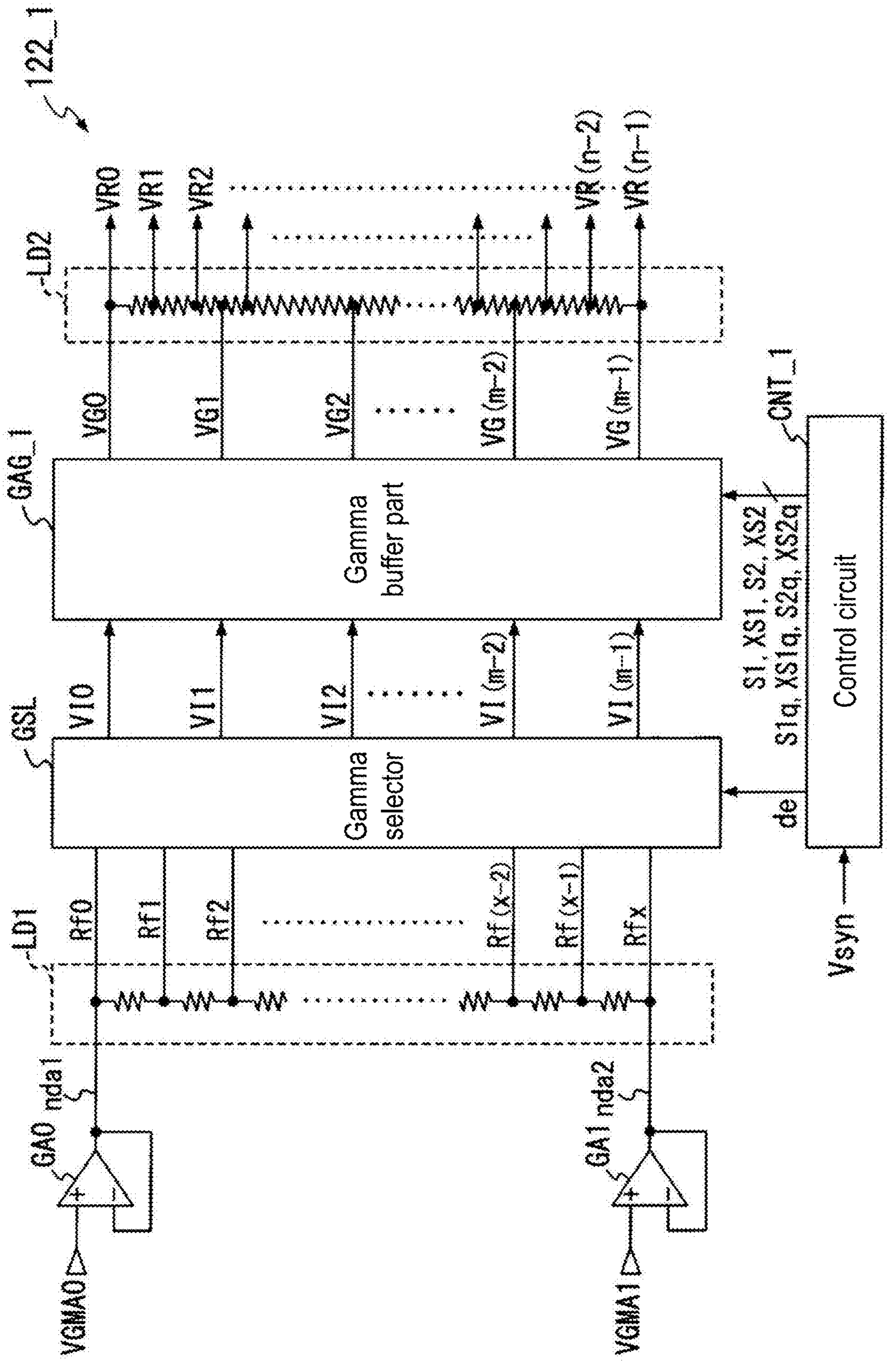
FIG. 14 is a circuit diagram showing an example of the internal configuration of the gradation voltage generation circuit 122.

FIG. 14 is a block diagram showing the internal configuration of a gradation voltage generation circuit 122_1 as the second example of the gradation voltage generation circuit 122.

It should be noted that the gradation voltage generation circuit 122_1 shown in FIG. 14 has the same configuration as shown in FIG. 3, except the gamma buffer part GAG_1 is adopted instead of the gamma buffer part GAG shown in FIG. 3, and the control circuit CNT_1 is adopted instead of the control circuit CNT.

The control circuit CNT_1, similar to the control circuit CNT, supplies a gamma characteristic specification signal de specifying the gamma characteristic to the gamma selector GSL, and generates switch signals S1, XS1, S2, and XS2 having waveforms shown in FIG. 6.

Furthermore, the control circuit CNT_1 generates switch signals S1*q*, XS1*q*, S2*q*, and XS2*q* that execute the first process at a timing different from the first process executed in response to the switch signals S1, XS1, S2, and XS2 within the vertical blanking period (V-BLANK) of each frame.

Then, the control circuit CNT_1 supplies the switch signals S1*q*, XS1*q*, S2*q*, and XS2*q* to the gamma buffer part GAG_1, together with the switch signals S1, XS1, S2, and XS2.

Figure 15:
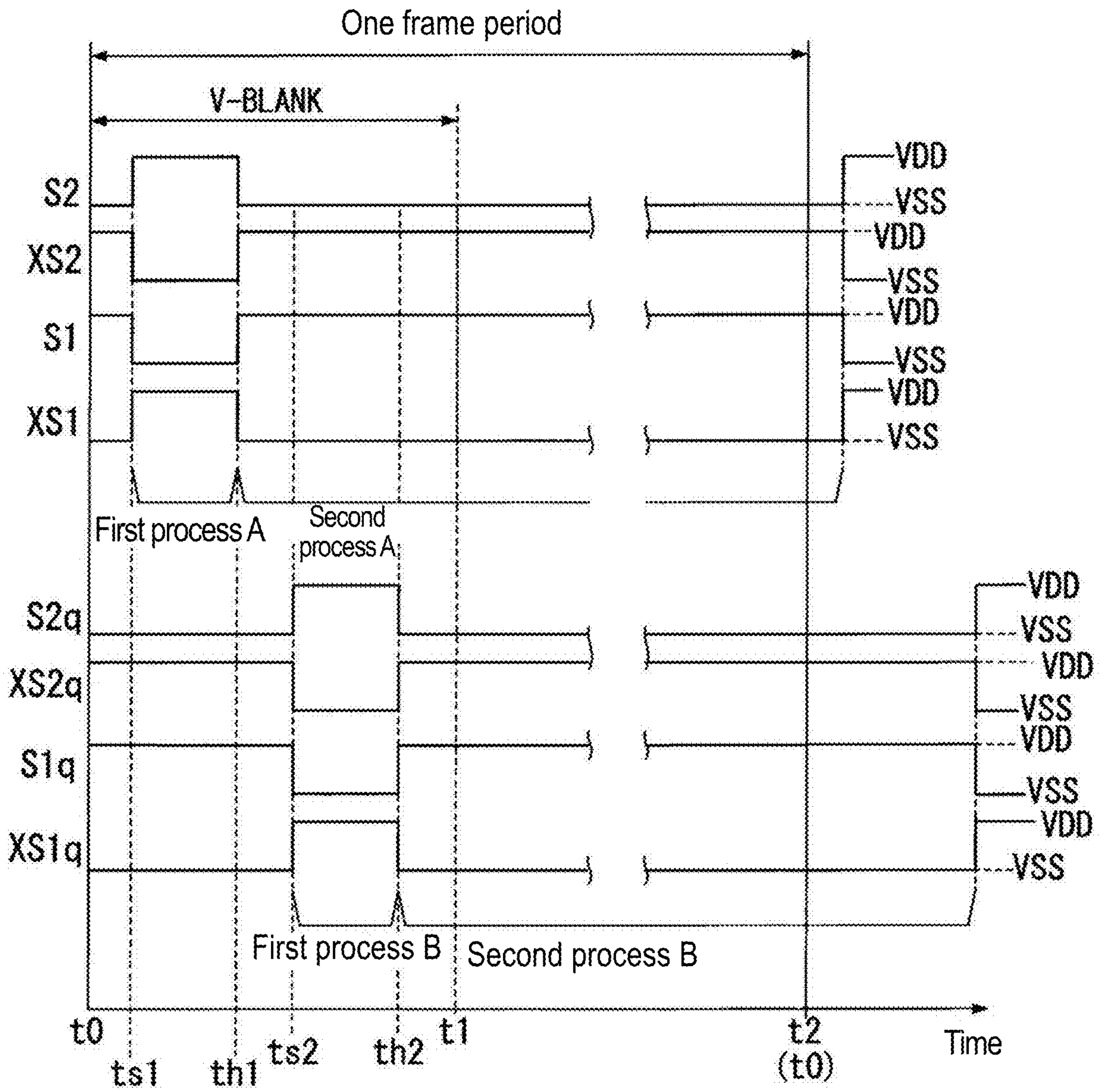
FIG. 15 is a time chart showing waveforms of the switch signals S1, XS1, S2, XS2, S1*q*, XS1*q*, S2*q*, and XS2*q*.

FIG. 15 is a time chart showing the waveforms of the switch signals S1, XS1, S2, and XS2, as well as the switch signals S1*q*, XS1*q*, S2*q*, and XS2*q*, each generated by the control circuit CNT_1 for each frame period.

As shown in FIG. 15, the switch signals S1 and XS2 transition from logic level 1 (VDD), which promotes the P-channel type transistors whose gate they are supplied to, to the off state, to logic level 0 (VSS), which promotes those P-channel type transistors to the on state, at time point ts1 within the vertical blanking period (time point t0 to time point t1) in one frame for each frame period, and maintain this state until time point th1 within the vertical blanking period (first process A). Then, the switch signals S1 and XS2 transition to logic level 1 (VDD), which promotes those P-channel type transistors to the off state, at this time point th1, and maintain this state until time point ts1 within the next vertical blanking period (second process A).

The switch signals S2 and XS1 transition from logic level 0 (VSS), which for example promotes the P-channel type transistors whose gate they are supplied to, to the on state, to logic level 1 (VDD), which promotes those P-channel type transistors to the off state, at time point ts1 within the vertical blanking period in one frame for each frame period, and maintain this state until time point th1 within the vertical blanking period (first process A). Then, the switch signals S2 and XS1 transition to logic level 0 (VSS), which promotes those P-channel type transistors to the on state, at this time point th1, and maintain this state until time point ts1 within the next vertical blanking period (second process A).

The switch signals S1*q* and XS2*q* transition from logic level 1 (VDD), which promotes the P-channel type transistors whose gate they are supplied to, to the off state, to logic level 0 (VSS), which promotes those P-channel type transistors to the on state, at time point ts2 that is later than time point th1 within the vertical blanking period, and maintain this state until time point th2 within the vertical blanking period (first process B). Then, the switch signals S1*q* and XS2*q* transition to logic level 1 (VDD), which promotes those P-channel type transistors to the off state, at this time point th2, and maintain this state until time point ts2 within the next vertical blanking period (second process B).

The switch signals S2*q* and XS1*q* transition from logic level 0 (VSS), which for example promotes the P-channel type transistors whose gate they are supplied to, to the on state, to logic level 1 (VDD), which promotes those P-channel type transistors to the off state, at time point ts2 within the vertical blanking period in one frame for each frame period, and maintain this state until time point th2 within the vertical blanking period (first process B). Then, the switch signals S2*q* and XS1*q* transition to logic level 0 (VSS), which promotes those P-channel type transistors to the on state, at this time point th2, and maintain this state until time point ts2 within the next vertical blanking period (second process B).

Figure 16:
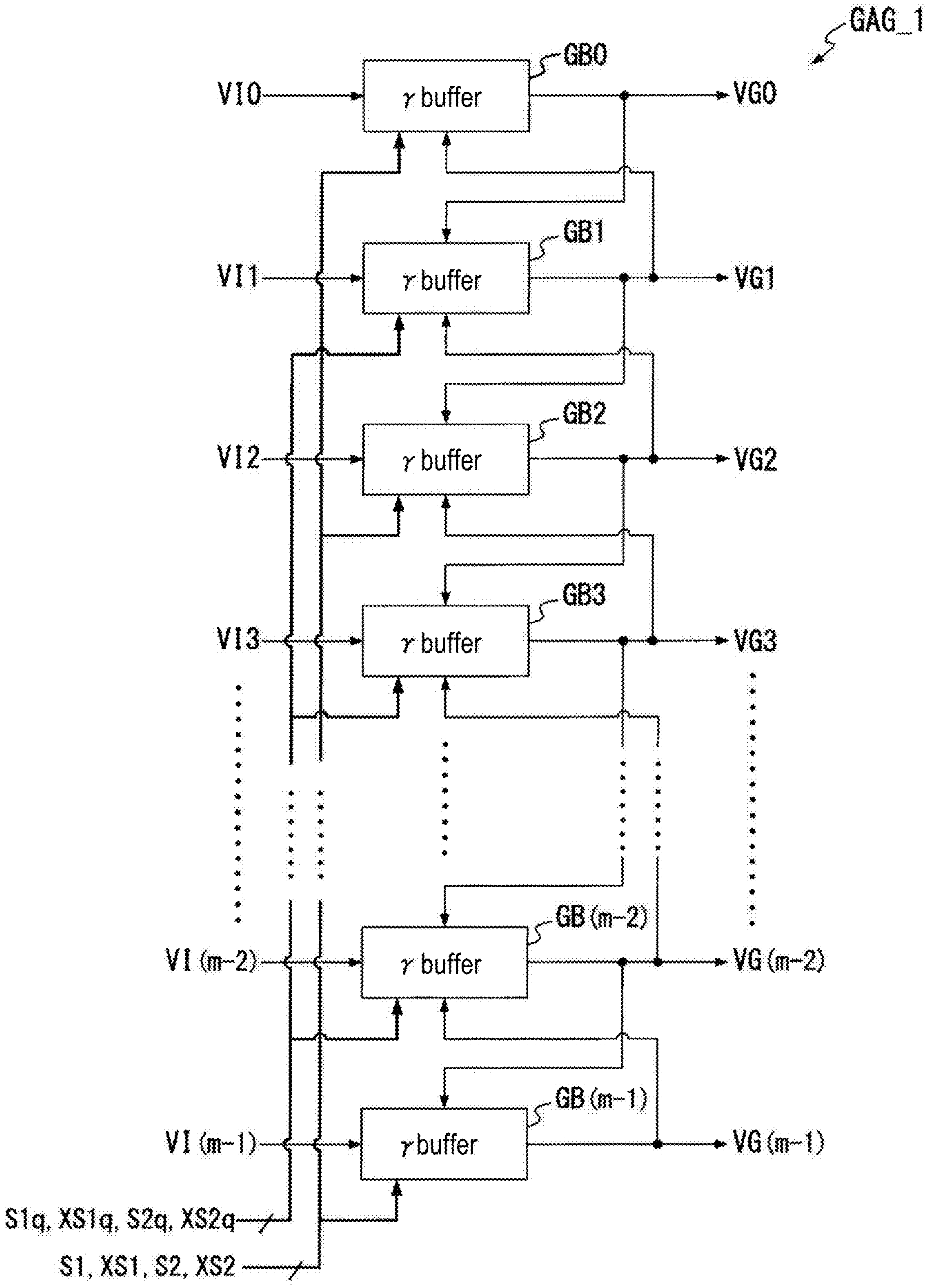
FIG. 16 is a block diagram showing another example of the internal configuration of the gamma buffer part GAG_1.

FIG. 16 is a block diagram showing the internal configuration of the gamma buffer part GAG_1.

It should be noted that the gamma buffers GB0 to GB(m−1) shown in FIG. 16 respectively have the internal configuration shown in FIG. 5, FIG. 9, FIG. 11, or FIG. 12, similar to the gamma buffer part GAG shown in FIG. 4A and FIG. 4B, and adjacent buffers are connected in the same configuration as shown in FIG. 4A and FIG. 4B.

However, in the gamma buffer part GAG_1, each of the even-numbered gamma buffers GB0, GB2, GB4, . . . , GB(m−1) among the gamma buffers GB0 to GB(m−1) receives the switch signals S1, XS1, S2, and XS2. Furthermore, the odd-numbered gamma buffers GB1, GB3, GB5, . . . , GB(m−2) receive the switch signals S1*q*, XS1*q*, S2*q*, and XS2*q*. That is to say, each of the odd-numbered gamma buffers GB1, GB3, GB5, . . . , GB(m−2) receives S1*q* as the switch signal S1, XS1*q* as the switch signal XS1, S2*q* as the switch signal S2, and XS2*q* as the switch signal XS2.

In the gradation voltage generation circuit 122_1, the execution timing of the offset cancellation operation in the first process is shifted between the group of even-numbered gamma buffers and the group of odd-numbered gamma buffers in this manner.

For example, when the odd-numbered gamma buffer GB1 outputs the gamma voltage VG1 without offset voltage by the offset cancellation operation in the first process, the low-amplitude control signal generated from the gamma voltages VG0 and VG2 is used. At this time, the even-numbered gamma buffers GB0 and GB2 outputting the gamma voltages VG0 and VG2 are in a stable state of the second process, so the offset cancellation operation of the gamma buffer GB1 is performed with a stable low-amplitude control signal. Similarly, when the even-numbered gamma buffer outputs a gamma voltage without offset voltage by the offset cancellation operation in the first process, a low-amplitude control signal generated from gamma voltages output from odd-numbered gamma buffers in a stable state of the second process is used.

As described above, since the offset voltage generated by capacitive coupling of the parasitic capacitance of the transistors constituting the switching elements depends on the amount of change (voltage difference) in the voltage applied to the gate during the on-off transition of the transistor, it is desirable that the low-amplitude control signal is stable. In a case where temporary noise occurs in the gamma voltage for generating the low-amplitude control signal, and the amplitude of the low-amplitude control signal in the first process temporarily expands, there is a possibility that the offset voltage may increase depending on the timing.

Therefore, by shifting the execution timing of the offset cancellation operation in the first process between the group of even-numbered gamma buffers and the group of odd-numbered gamma buffers as in the gradation voltage generation circuit 122_1, stable low-amplitude control signals can be used, which as a result, makes it possible to output gamma voltages with high accuracy.

It should be noted that in the gradation voltage generation circuit 122 or 122_1 serving as the level voltage generation circuit, the reference voltages VI0 to VI(m−1) are generated by a reference voltage generation part including amplifiers GA0 and GA1, a resistor string LD1, and a gamma selector GSL, but the disclosure is not limited to this configuration. In other words, the reference voltage generation part may be any part that generates multiple reference voltages according to the desired gamma characteristic.

In addition, in the examples described above, all of the gamma buffers GB0 to GB(m−1) are configured as offset cancellation amplifiers, but it is sufficient if at least one of the gamma buffers includes an offset cancellation amplifier.

Moreover, although the examples described above illustrate the offset cancellation circuit as shown in FIG. 5, FIG. 8, FIG. 9, FIG. 11, or FIG. 12, a configuration other than that shown in FIG. 5, FIG. 8, FIG. 9, FIG. 11, or FIG. 12 may be adopted as the offset cancellation circuit.

In essence, the level generation circuit (gradation voltage generation circuit) according to the disclosure may include a resistor string, a reference voltage generation part, and first to $m^{th}$ gamma buffers, as follows.

That is, the resistor string (LD2) includes multiple resistors connected in series to each other respectively via multiple taps, and outputs level voltages [VR0 to VR(n−1)] having different voltage levels respectively from the taps.

The reference voltage generation part (GA0, GA1, LD1, GSL) generates m reference voltages [VI0 to VI(m−1)] according to the desired gamma characteristic, which also include linear characteristics.

The first to $m^{th}$ gamma buffers [GB0 to GB(m−1)] operate by individually receiving the m reference voltages, and receiving the supply of two power supply voltages (VDD and VSS) to generate, as m gamma voltages [VG0 to VG(m−1)], m voltages obtained by individually amplifying the m reference voltages, and output the m gamma voltages to m taps among the multiple taps.

It should be noted that at least one gamma buffer (VBk) among the first to $m^{th}$ gamma buffers includes the following offset cancellation amplifier and control signal output circuit. In other words, the offset cancellation amplifier (for example, A1_*k*_1) includes an offset cancellation circuit (for example, 16 to 18 and Ca) that removes the offset voltage occurring in the gamma voltage (VGk) output by the gamma buffer (VBk) in response to the binary control signal (SCk, XSCk). The control signal output circuit (for example, A2_*k*_1) receives two voltages [for example, VG(k−1) and VG(k+1)], which are selected from among the m gamma voltages output by the first to $m^{th}$ gamma buffers including the gamma buffer (VBk) and the two power supply voltages (VDD and VSS) and in which the voltage difference therebetween is lower than the difference between the two power supply voltages, generates a control signal representing these two voltages as the binary, and outputs the control signal to the offset cancellation circuit.

What is claimed is:

1. A level voltage generation circuit, comprising:

a resistor string comprising a plurality of resistors connected in series to each other respectively via each of a plurality of taps, and outputting a plurality of level voltages having different voltage levels respectively from the taps;

a reference voltage generation part generating m (m is an integer of 2 or more) reference voltages having different voltage values respectively; and first to $m^{th}$ gamma buffers operating by individually receiving the m reference voltages respectively, and receiving supply of two power supply voltages to generate, as m gamma voltages, m voltages obtained by individually amplifying the m reference voltages, and output the m gamma voltages to m taps among the plurality of taps, wherein at least one gamma buffer among the first to $m^{th}$ gamma buffers comprises:

an offset cancellation amplifier comprising an offset cancellation circuit that removes an offset voltage occurring in the gamma voltage output by the at least one gamma buffer in response to a control signal of a binary; and a control signal output circuit receiving two voltages which are selected from the m gamma voltages output by the first to $m^{th}$ gamma buffers including the at least one gamma buffer and the two power supply voltages and in which a voltage difference therebetween is lower than a difference between the two power supply voltages, generating the control signal with low-amplitude with the two voltages as the binary, and outputting the control signal to the offset cancellation circuit.

2. The level voltage generation circuit according to claim 1, wherein one of the two voltages is the gamma voltage output by the one gamma buffer.

3. The level voltage generation circuit according to claim 1, wherein the offset cancellation circuit comprises a first capacitive element, the offset cancellation amplifier executes sequentially:

a first process of accumulating the offset voltage or the gamma voltage causing the offset voltage in the first capacitive element based on the control signal; and a second process of holding the voltage accumulated in the first capacitive element, and supplying a gamma voltage with the offset voltage removed from the gamma voltage output by the one gamma buffer to the tap of the resistor string, and the control signal output circuit:

generates the control signal having one of the two voltages in the first process; and generates the control signal having the other one of the two voltages in the second process.

4. The level voltage generation circuit according to claim 3, wherein the offset cancellation amplifier executes the first process and the second process sequentially while supplying the voltage of the output node as the gamma voltage to the tap of the resistor string.

5. The level voltage generation circuit according to claim 3, wherein the offset cancellation amplifier comprises:

an output node outputting the gamma voltage;

a first differential pair comprising a first input terminal that receives the reference voltage and a second input terminal that receives a voltage of the output node, and sending a pair of currents corresponding to a difference between the reference voltage and the voltage of the output node; and an amplification stage sending a current corresponding to a difference between the pair of currents to the output node, the offset cancellation circuit comprises a first switching element that is controlled on and off in response to the control signal and, in an on state, connects one terminal of the first capacitive element and the second input terminal of the first differential pair to the output node and, in an off state, disconnects the output node and the connection node between the one terminal of the first capacitance element and the second input terminal of the first differential pair, in the first process, in a state where a predetermined voltage is applied to the other terminal of the first capacitive element, the control signal output circuit supplies the control signal that turns on the first switching element to the first switching element to accumulate the offset voltage in the first capacitive element, and in the second process, in a state where the output node and the other terminal of the first capacitive element are connected, the control signal output circuit supplies the control signal that turns off the first switching element to the first switching element so that the offset voltage accumulated in the first capacitive element is held, resulting in the offset voltage being removed from the voltage of the output node.

6. The level voltage generation circuit according to claim 3, wherein the offset cancellation circuit comprises:

a second switching element that, in an on state, connects the first input terminal of the first differential pair to the other terminal of the first capacitive element; and a third switching element that, in an on state, connects the other terminal of the first capacitive element to the output node, in the first process, the second switch element and the third switch element are controlled to be turned on and off, respectively, and a voltage applied to the first input terminal of the first differential pair is also applied to the other end of the first capacitance element as the predetermined voltage, and in the second process, the second switch element and the third switch element are controlled to be off and on, respectively, and the voltage of the output node is fed back to the second input terminal of the first differential pair via the first capacitance element.

7. The level voltage generation circuit according to claim 3, wherein the offset cancellation amplifier comprises:

an output node outputting the gamma voltage;

a first differential pair comprising a first input terminal that receives the reference voltage and a second input terminal that receives a voltage of the output node, and sending a pair of currents corresponding to a difference between the reference voltage and the voltage of the output node; and an amplification stage sending a current corresponding to a difference between the pair of currents to the output node, the control signal output circuit generates an inverted control signal that inverts a level of the control signal, the offset cancellation circuit comprises:

a first switching element that is controlled on and off in response to the control signal and, in an on state, connects the output node to the second input terminal of the first differential pair;

a second switching element that is controlled on and off in response to the control signal and, in an on state, connects the output node to one terminal of the first capacitive element; and a third switching element that is controlled on and off in response to the inverted control signal and, in an on state, connects one terminal of the first capacitive element to the second input terminal of the first differential pair, in the first process, in a state where the first input terminal of the first differential pair and the other terminal of the first capacitive element are connected, the control signal output circuit supplies the control signal that turns on the first switching element and the second switching element to the first switching element and the second switching element, and supplies the inverted control signal that turns off the third switching element to the third switching element to accumulate the offset voltage in the first capacitive element, and in the second process, in a state where the output node and the other terminal of the first capacitive element are connected, the control signal output circuit supplies the control signal that turns off the first switching element and the second switching element to the first switching element and the second switching element, and supplies the inverted control signal that turns on the third switching element to the third switching element so that the offset voltage accumulated in the first capacitive element is held, resulting in the offset voltage being removed from the voltage of the output node.

8. The level voltage generation circuit according to claim 3, wherein the offset cancellation amplifier comprises:

an output node outputting the gamma voltage;

a first differential pair comprising a first input terminal that receives a voltage of the output node and a second input terminal that receives the reference voltage, and flowing a pair of currents corresponding to a difference between the voltage of the output node and the reference voltage to a pair of nodes; and an amplification stage sending a current corresponding to a difference between the currents flowing through the pair of nodes to the output node, the offset cancellation circuit comprises:

a switch circuit selecting and supplying one of the reference voltage and the voltage of the output node to the first input terminal of the first differential pair;

a second capacitive element in addition to the first capacitive element;

a second differential pair comprising a first input terminal connected to one terminal of the first capacitive element and a second input terminal connected to one terminal of the second capacitive element, and flowing a pair of currents corresponding to a difference between a voltage at the one terminal of the first capacitive element and a voltage at the one terminal of the second capacitive element to the pair of nodes;

a first switching element that is controlled on and off in response to the control signal and, in an on state, applying the voltage of the output node to the one terminal of the first capacitive element; and a second switching element that is controlled on and off in response to the control signal and, in an on state, applying the reference voltage to the one terminal of the second capacitive element, in the first process, the switch circuit is controlled so that the reference voltage is supplied to the first input terminal of the first differential pair, and based on the control signal, the first switching element and the second switching element are turned on to accumulate the voltage of the output node where the offset voltage is occurring in the first capacitive element and accumulate the reference voltage in the second capacitive element, and in the second process, the switch circuit is controlled so that the voltage of the output node is supplied to the first input terminal of the first differential pair, and based on the control signal, the first switching element and the second switching element are turned off so that voltages accumulated in the first capacitive element and the second capacitive element in the first process are held respectively as voltages at the first input terminal and the second input terminal of the second differential pair, resulting in the offset voltage being removed from the voltage of the output node.

9. A display driver, comprising the level voltage generation circuit according to claim 3 as a gradation voltage generation circuit, wherein the first process is performed within a vertical blanking period of a frame period in a video signal.

10. The display driver according to claim 9, wherein the first to $m^{th}$ gamma buffers are grouped into at least two gamma buffer groups, and within the vertical blanking period, the first process is executed at a different timing for each of the gamma buffer groups.

11. The display driver according to claim 10, wherein the first to $m^{th}$ gamma buffers are grouped into two groups of an odd-numbered gamma buffer group and an even-numbered gamma buffer group.

12. A display device, comprising:

a display panel comprising a plurality of data lines on which a plurality of display cells are disposed; and a display driver comprising the level voltage generation circuit according to claim 1 as a gradation voltage generation circuit, using the plurality of level voltages output from the level voltage generation circuit as a plurality of gradation voltages, selecting for each pixel based on a video signal the gradation voltage corresponding to a brightness level indicated by the pixel from among the plurality of gradation voltages, and outputting a drive signal having the selected gradation voltage to the data line.

* * * * *